(12) United States Patent
Pratz et al.

(10) Patent No.: US 11,423,712 B2
(45) Date of Patent: Aug. 23, 2022

(54) BLOCKCHAIN BASED HARDWARE APPLIANCE AUTHENTICATION

(71) Applicant: Car IQ Inc., Oakland, CA (US)

(72) Inventors: Sterling Pratz, San Francisco, CA (US); Orang Ryan Tabibian, Lafayette, CA (US); Mark McCabe, Point Richmond, CA (US)

(73) Assignee: CAR IQ INC., Oakland, CA (US)

( * ) Notice: Subject to any disclaimer, the term of this patent is extended or adjusted under 35 U.S.C. 154(b) by 490 days.

(21) Appl. No.: 16/541,712

(22) Filed: Aug. 15, 2019

(65) Prior Publication Data

US 2020/0058176 A1    Feb. 20, 2020

Related U.S. Application Data

(60) Provisional application No. 62/764,760, filed on Aug. 16, 2018.

(51) Int. Cl.
*G07C 5/08*      (2006.01)
*H04L 9/06*      (2006.01)

(52) U.S. Cl.
CPC ......... *G07C 5/0808* (2013.01); *G07C 5/0841* (2013.01); *H04L 9/0637* (2013.01)

(58) Field of Classification Search
CPC .... G07C 5/0808; G07C 5/0841; G07C 5/008; H04L 9/0637; H04L 9/3226; H04L 9/3239; H04L 9/3247; H04L 2209/38; H04L 2209/805; H04L 2209/84; G06Q 50/30
See application file for complete search history.

(56) References Cited

U.S. PATENT DOCUMENTS

| 10,440,028 | B1 * | 10/2019 | Makmel ............... H04L 63/08 |
| 2008/0232595 | A1 | 9/2008 | Pietrowicz et al. |
| 2017/0046652 | A1 | 2/2017 | Haldenby et al. |
| 2017/0195336 | A1 | 7/2017 | Ouellette |
| 2017/0302663 | A1 | 10/2017 | Nainar et al. |
| 2018/0012433 | A1 | 1/2018 | Ricci |
| 2020/0193743 | A1 | 6/2020 | Pratz et al. |
| 2020/0193744 | A1 | 6/2020 | Pratz et al. |

FOREIGN PATENT DOCUMENTS

| EP | 3336735 | 6/2018 |
| WO | 2020037149 | 2/2020 |

OTHER PUBLICATIONS

"European Application Serial No. 19849771.1, Extended European Search Report dated Sep. 23, 2021", 9 pgs.
"International Application Serial No. PCT US2019 046704, International Preliminary Report on Patentability dated Feb. 25, 2021", 7 pgs.

(Continued)

*Primary Examiner* — Michael V Kerrigan
(74) *Attorney, Agent, or Firm* — Dana Legal Services; Jubin Dana

(57) ABSTRACT

Hardware appliances with multiple sensors, such as automobiles, can be authenticated on a blockchain based platform using authentication values generated data provided by the hardware appliances, such as sensor data, log data, location data. Requests for service can be managed by the blockchain based platform based on authentication values of the hardware appliances.

20 Claims, 26 Drawing Sheets

(56) References Cited

OTHER PUBLICATIONS

"International Application Serial No. PCT US2019 046704, International Search Report dated Nov. 1, 2019", 2 pgs.
"International Application Serial No. PCT US2019 046704, Written Opinion dated Nov. 1, 2019", 5 pgs.
Kang, "Enabling localized peer-to-peer electricity trading among plug-in hybrid electric vehicles using consortium blockchains", In: IEEE Transactions on Industrial Informatics 13.6. 29, [Online] Retrieved from the internet:http: folk.uio.no yanzhang IEEETII2017Blockchain.pdf entire document, (May 29, 2017), 11 pgs.
Oham, "A Blockchain Based Liability Attribution Framework for Autonomous Vehicles", In: arXiv preprint arXiv:1802.05050, [Online] Retrieved from the internet:https: arxiv.org pdf 1802.05050.pdf entire document, (Feb. 14, 2018), 13 pgs.

* cited by examiner

| CAR LIST | HISTORY | TRANSACTIONS | | | | | | FLEET OWNER FLOYD ⌄ |
|---|---|---|---|---|---|---|---|---|
| ALL CARS | ISSUED FOUND ④ | ON SERVICE | | | | SEARCH FOR BRAND, MODEL, VIN | | |
| | UNIQUE ID | VEHICLE | VIN NUMBER | ODOMETER | LAST VERIFIED | SCORE | STATUS | |
| ☐ ⬭ | #0001 | PORTOLA 2012 | 2T1BURHEOJC965580 | 135 604 | - | 12 | ● ACTIVE | |
| ☐ ◈ | #3313361 | BX-9 2014 | 3431HAAN21121T522 | 50 451 | 3 DAYS AGO | 84 | ● LOW TIRE PRESSURE | |
| ☐ ⬭ | #3324XC4 | TAMRA 2005 | 2T1BURHEOJC965580 | 249 057 | 4 DAYS AGO | 90 | ● LOW FUEL LEVEL | |
| ☐ ⬭ | #245A771 | ACME SPORTS SUV 2017 | JC31URH332C965642 | 180 852 | 5 DAYS AGO | 91 | ● 2 ISSUES FOUND | |
| ☐ ⬭ | #3324XC4 | FASTCAR GT 2005 | U445HHCN22421T535 | 267 890 | A WEEK AGO | 53 | ● ACTIVE | |
| ☐ ◈ | #74G12A1 | SOCCER VAN 2016 | U445HHCN22421T535 | 60 941 | A WEEK AGO | 93 | ● LOW FUEL LEVEL | |
| ☐ ⬭ | #444B231 | FISSION 2007 | 2T1BURHEOJC965580 | 92 308 | A MONTH AGO | 47 | ● ACTIVE | |
| ☐ ◇ | #AA23340 | GNRX-4 2016 | 2T1BURHEOJC965580 | 118 470 | 2 MONTH AGO | 88 | ● ACTIVE | |

| ALL ORDERS | NOW ④ | TO REPAIR | PAYED | | | |
|---|---|---|---|---|---|---|
| VEHICLE | CAR ISSUE | | CAR LOCATION | | UPDATED 1221 | STATUS |
| ACME SPORTS SUV 2017 | LOW TIRE PRESSURE | | ⊙ 699-601 BALBOA ST. SAN FRANCISCO | | TODAY | • NEW ORDER |
| PORTOLA 2012 | FAILED EMISSIONS TEST | | ⊙ 3900-3998 18TH ST. SAN FRANCISCO | | YESTERDAY | • APPROVE REQUESTED |
| BX-9 2014 | LOW FUEL LEVEL | | ⊙ 699-601 CAPP ST. SAN FRANCISCO | | YESTERDAY | • TO REPAIR |
| TAMRA 2005 | ENGINE ERROR CODE PID4425 | | ⊙ 3900-3998 18TH ST. SAN FRANCISCO | | YESTERDAY | • IN PROGRESS |
| ACME SPORTS SUV 2009 | LOW FUEL LEVEL | | ⊙ 699-601 CAPP ST. SAN FRANCISCO | | 3 DAYS AGO | • IN PROGRESS |
| FASTCAR GT 2005 | SLIPPING AUTOMATIC TRANSMISSION | | ⊙ 699-601 CAPP ST. SAN FRANCISCO | | 4 DAYS AGO | • COMPLETED |
| SOCCER VAN 2016 | LOW FUEL LEVEL | | ⊙ 699-601 CAPP ST. SAN FRANCISCO | | 6 DAYS AGO | • PAYED |
| FISSION 2007 | LOW FUEL LEVEL | | ⊙ 699-601 CAPP ST. SAN FRANCISCO | | A WEEK AGO | • PAYED |

FIG. 12I

BLOCKCHAIN BASED HARDWARE APPLIANCE AUTHENTICATION

PRIORITY

This application claims the benefit of priority to U.S. Provisional Patent Application No. 62/764,760, filed Aug. 16, 2018, which is incorporated by reference herein in its entirety.

TECHNICAL FIELD

Embodiments of the present disclosure relate generally to image manipulation and, more particularly, but not by way of limitation, to interactions with hardware appliances, such as vehicles or home appliances.

BACKGROUND

Hardware appliances, such as cars or laundry machines, are increasingly becoming "smart" through integration of network-enabled computers into such devices. While these smart devices have advanced networking capabilities, it can be difficult to authenticate smart devices because, like computers, smart-enabled appliances are susceptible to hacking and fraudulent manipulation by malicious entities, such as malware or malicious users.

BRIEF DESCRIPTION OF THE DRAWINGS

To easily identify the discussion of any particular element or act, the most significant digit or digits in a reference number refer to the figure ("FIG.") number in which that element or act is first introduced.

FIGS. 12A-12K show example user interfaces for implementing hardware appliance authentication, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1A:
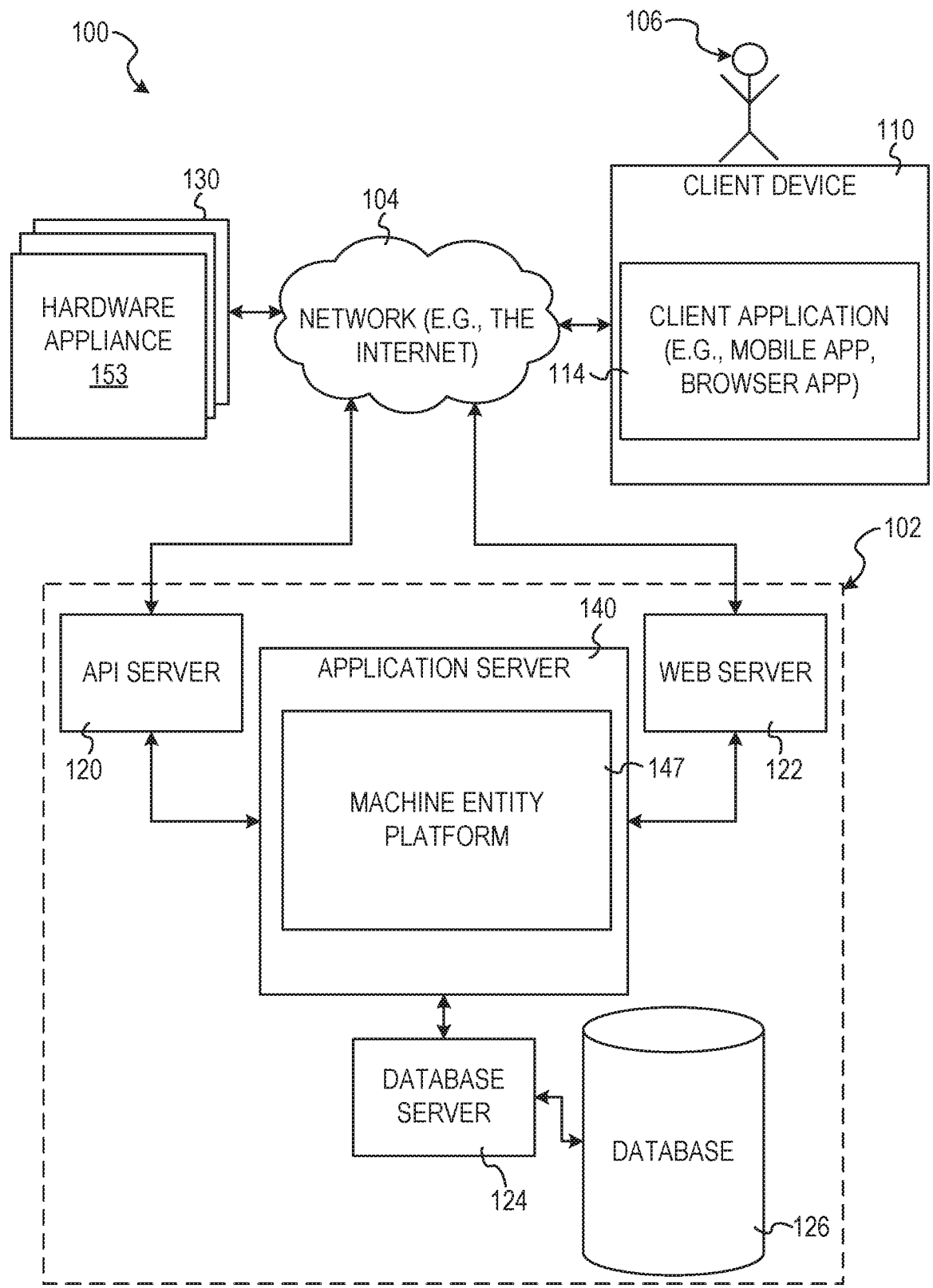
FIGS. 1A and 1B show example network architectures, according to some example embodiments.

With reference to FIG. 1A, an example embodiment of a high-level client-server-based network architecture 100 is shown. A networked system 102, in the example forms of a network-based management platform that can provide server-side processing via a network 104 (e.g., the Internet or wide area network (WAN)) to one or more client devices 110. In some implementations, a user (e.g., user 106) interacts with the networked system 102 using the client device 110. The client device 110 may execute the application 114 as a local application, e.g., an application integrated into an operation system of the client device 110 or a cloud-based application (e.g., through an Internet browser portal accessible via a user session created after logging in via username and password validation).

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game consoles, set-top box, network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like. The instances may be platform specific to the operating system or device in which they are installed. For example, the first instance may be an iOS application and the second instance may be an Android application.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a Wireless Fidelity (WI-FI®) network, a Worldwide Interoperability for Microwave Access (WiMax) network, another type of network, or any suitable combination thereof.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application server 140. The application server 140 can host a machine entity platform 147, which can comprise one or more modules or applications and each of which can be embodied as hardware, software, firmware, or any combination thereof. The application server 140 is, in turn, shown to be coupled to a database server 124 that facilitates access to one or more information storage repositories, such as database 126 (e.g., relational database system, blockchain distributed ledger). In an example embodiment, the database 126 comprises one or more storage devices that store information to be accessed by the platform 147, such as block objects where each block object is a database object corresponding to a hardware appliance 153 (e.g., an autonomous vehicle, a rental vehicle, a smart refrigerator). Additionally, in some embodiments, block object data may be cached locally on the client device 110. Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example as discussed below with reference to FIG. 3.

Figure 1B:
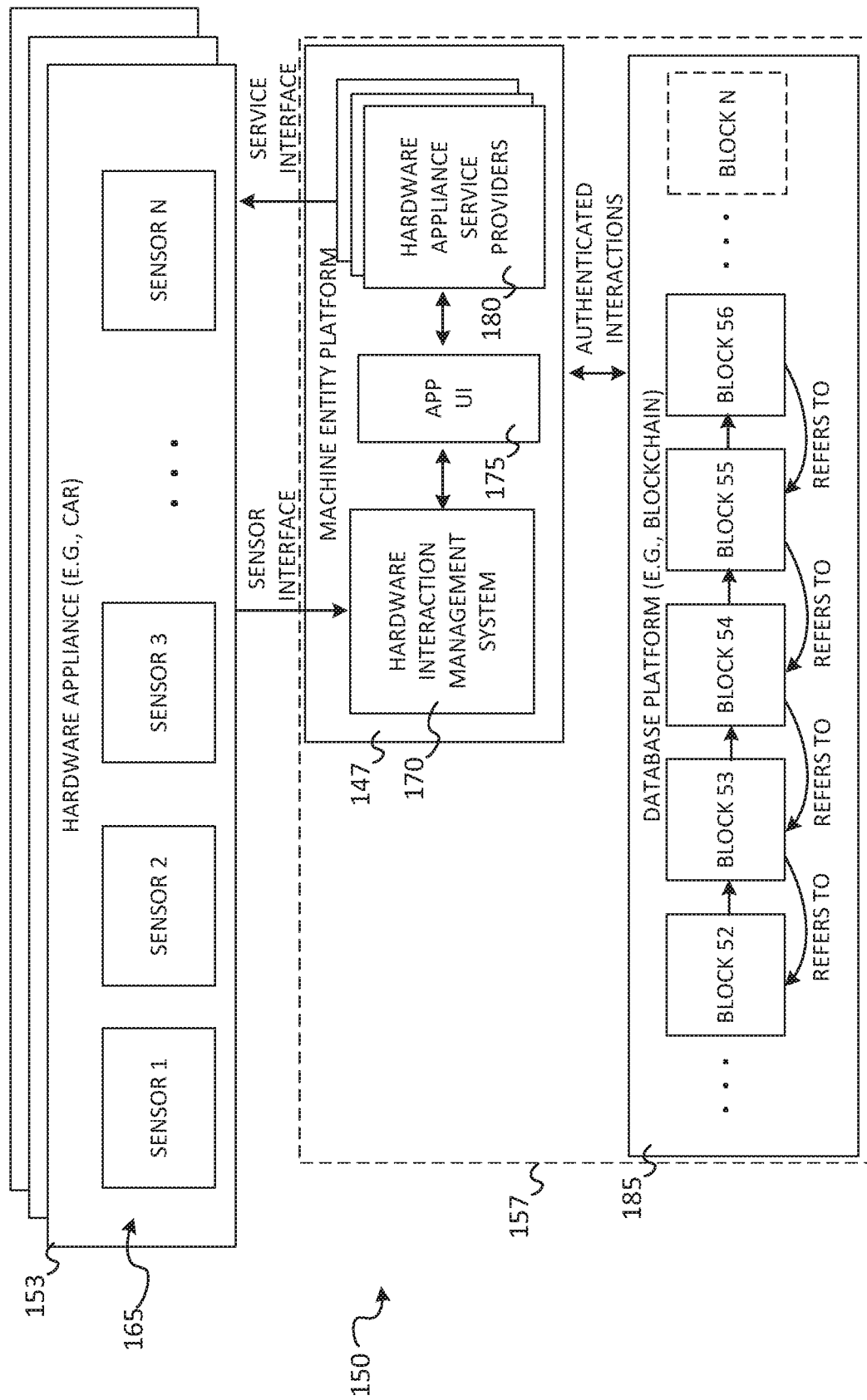

FIG. 1B shows an example hardware authentication network architecture 150 for management of authentication and processing of hardware appliance-based requests, according to some example embodiments. In the hardware authentication network architecture 150, a plurality of hardware appliances 153 interact with the machine entity platform 147 (hosted on server 140) for different service tasks that are managed on a database 185, such as a distributed ledger or blockchain. As illustrated, each block of the blockchain references a previous block (e.g., a hash of a previous block), such that any change to previous blocks changes hash values of later blocks and such changes can be invalidated by blockchain entities (e.g., peers, miners).

The hardware appliances 153 each include a plurality of sensors that measure different parameters of a given appliance. For example, the hardware appliances 153 can be a fleet of cars with sensors 165 that measure different operational parameters of the cars. For instance, in some example embodiments, "sensor 1" is an odometer that measures how far a given car has traveled, "sensor 2" is a fuel gauge that measures the fuel level of the given car, "sensor 3" is a location sensor (e.g., GPS sensor) that measures the given car's current and past locations, and so on. The sensor data from the plurality of sensors 165 is transmitted to a machine entity platform 147 via a vehicle interface (e.g., a telematics interface, OEM interface, OBD interface, API network interface, as discussed in further detail below in FIG. 2). For example, each of the cars can include a network interface (e.g., telematics device with an Internet connection or SIM-card based wireless connection) that uploads sensor data over a secure channel to the entity platform 147. Although a vehicle is discussed here as an example hardware appliance, it is appreciated that other hardware appliances that have a plurality of sensors can likewise be managed by the hardware authentication network architecture 150. For example, a smart refrigerator can include a plurality of sensors (e.g., freezer temperature, main compartment temperature, quantities of items stored), and upload the refrigerator sensor data to the machine entity platform 147 over a network interface (e.g., SIM-card based wireless card, physical network cord connections, such as a direct connection to a user's home router).

The machine entity platform 147 includes a hardware interaction management system 170 that manages generating and updating a fingerprint access data for each of the plurality of hardware appliances 153. The fingerprint access data for a given hardware appliance is a value used to permit or deny interaction requests (e.g., service requests) over the hardware authentication network architecture 150. For example, if a car hardware appliance is low on fuel, a fuel refill request can be generated by the hardware appliance or by another entity (e.g., fleet owner, service provider), and the fuel refill request is approved or rejected based on the fingerprint access data meeting or not meeting a pre-configured threshold in a smartcontract managed by the architecture 150. As an example, if the fingerprint access data is out of ten, and fuel refill requests have preconfigured threshold for fuel refills of seven, then the fuel refill request will be authorized if the car's fingerprint access data is seven or higher. Different example embodiments for generating fingerprint access data for each of the hardware appliances is discussed in further detail below with reference to FIG. 8.

In some example embodiments, the hardware appliance tasks from which requests can be generated are specified in a smartcontract that is managed by a blockchain. A smartcontract is a unit of programmable code containing conditions and parameters, that can be manipulated by blockchain entities (e.g., peers, miners, clients) to record data on a blockchain. In some example embodiments, the smartcontract specifies hardware appliance tasks that can be automatically or manually approved for completion (e.g., via a service provider of the hardware appliance).

Upon completion of tasks or upon receipt of data (e.g., sensor data) from the hardware appliances, entries can be submitted to an immutable database platform 185, such as a distributed ledger. The database platform 185 can include, for example, a cryptocurrency based blockchain, an Ethereum blockchain, a Hyperledger Fabric blockchain system, or other types of immutable distributed database environments. In some example embodiments, the database platform 185 is an external network with which the machine entity platform 147 interacts (e.g., via submission of requests to miners of the blockchain network). For instance, according to some example embodiments, the database platform 185 is an Ethereum network in which the smartcontracts are interacted with via requests to Ethereum miners. In some example embodiments, the database platform 185 is a private permissioned blockchain network (e.g., Hyperledger Fabric) managed as part of the machine entity platform 147 as denoted by the dotted line entity domain 157.

Hardware appliance service providers 180 are entities that interact with the hardware appliances 153. Example service providers can include a manufacturer that manufactured the hardware appliances (e.g., a car manufacturer), a fleet owner of multiple hardware appliances (e.g., an administrator of a company that owns a fleet of rental cars or autonomous self-driving cars), maintenance providers (e.g., auto mechanics), or machine kiosks, such a toll booth or gas station pump equipped with a network computer having an API configured to send information, such as sensor data, to API server 120 (FIG. 1). In some example embodiments, the service providers 180 interact with an application user interface 175 (e.g., mobile application, web-browser based interface) to perform tasks involving the hardware appliances 153, according to some example embodiments. For example, a fleet manager service provider can request a plurality of maintenance operations from an auto mechanic service provider, where each communication is stored on the immutable database 185 and further where authentication and approval are performed using the fingerprint access data as permission access values are input into a smartcontract.

Figure 2:
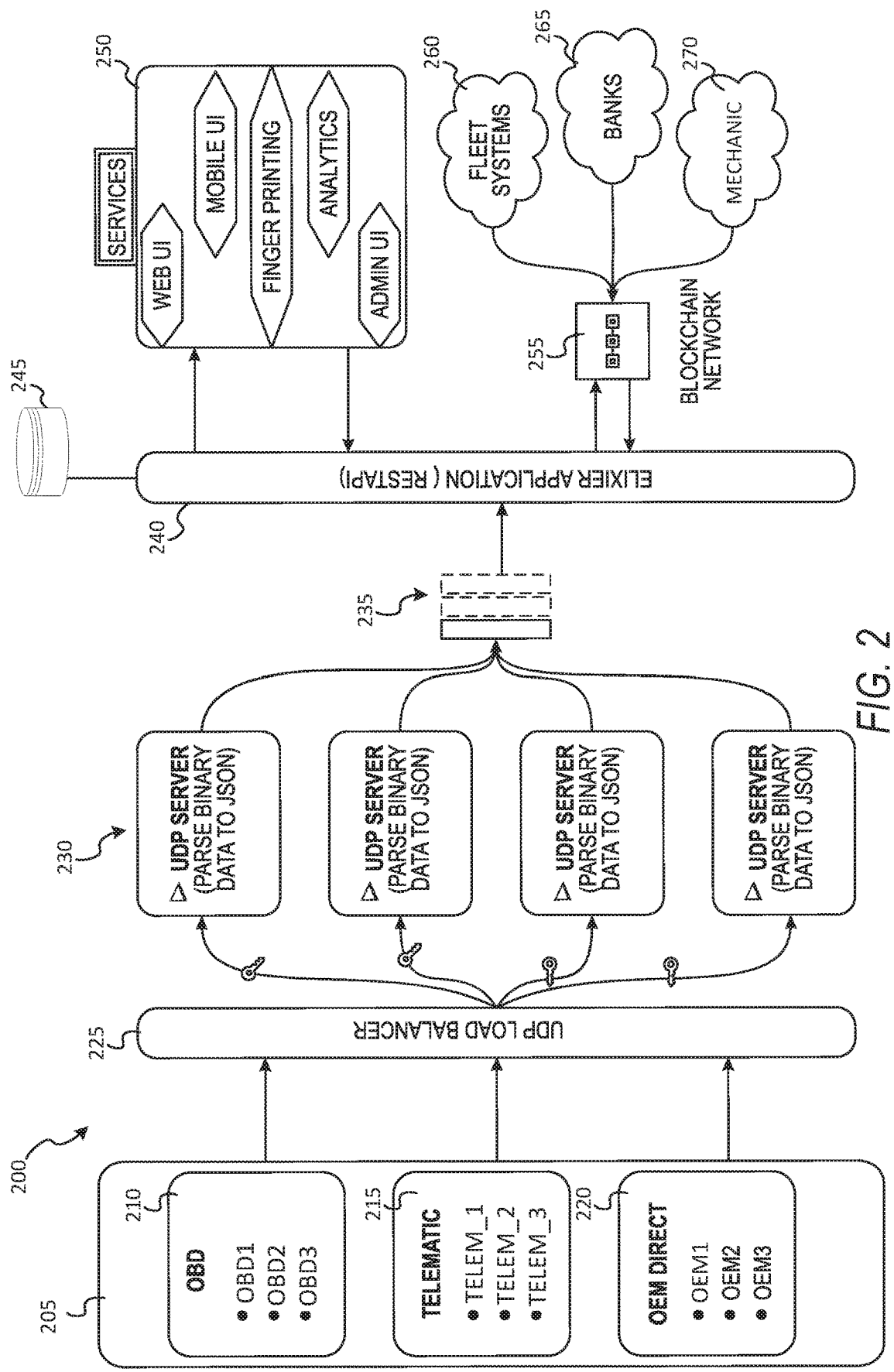
FIG. 2 shows an example runtime data architecture for a hardware appliance authentication network architecture, according to some example embodiments.

FIG. 2 shows an example runtime data architecture 200 for an automobile hardware appliance managed by the hardware authentication network architecture 150, according to some example embodiment. In the example of FIG. 2, the hardware appliance is a car 205 (e.g., self-driving car, rental car) with a plurality of sensors (not depicted in FIG. 2 for brevity). Example sensor system can include, for example: a door control unit (DCU), an engine control unit (ECU), an electric power steering control unit (PSCU, which will generally be integrated into an EPS powerpack), a human machine interface (HMI), a powertrain control module (PCM, where in some examples, the functions of the engine control unit and a transmission control unit (TCU) are combined into a single unit, which is the PCM), a seat control unit, a speed control unit (SCU), a telematic control unit (TCU), a transmission control unit (TCU), a brake control module (BCM; ABS or ESC), and a battery management system (BMS), and additional sensors that track operational metrics of the hardware appliance.

In some example embodiments, vehicle data is collected by a vehicle data interface, such as an OBD interface 210, a telematic interface 215, or an OEM interface 220. The collected data can include non-sensor based data stored on the car's memory (e.g., ECU memory), such as VIN data, ignition cycle data, error codes, etc. The vehicle data interfaces input upload data into a load balancer 225 (e.g., UDP load balancer, TCP load balancer), which distributes the uploaded data to a plurality of parsers 230 (e.g., UDP parsers, TCP parsers). The data output from the UDP parsers 230 is then collected in a message service 235, such as Amazon Simple Queuing Service (AWS-SQS). The queued messages are then input into an application interface 240 managed by the entity platform 147, such an Elixir Application RestAPI. The collected data can then be stored in a database 245 (e.g., a database management system, such as Oracle Relational Database System (RDMS), Amazon RDMS, Apache Hadoop). In some example embodiments, different types of data from the vehicle 205 are updated at different times or rates. For example, fuel data may be received from the vehicle 205 and stored in database 245 every hour, whereas log data (e.g., VIN) is received from the car and stored in the database 245 once per day due.

The hardware interaction management system 250 (e.g., an example embodiment of system 17) then analyzes the vehicle data stored in the database 245 and generates fingerprint access data for the vehicle 205, which can be updated using new sensor data (e.g., periodically updated, updated in response to a service request, etc.). In some example embodiments, the vehicle data is stored in an immutable distributed database, such as a blockchain database 255. The blockchain database functions as an immutable storage device for records of the vehicle and can further be configured to manage smart contracts that service providers 260-270 use to interact with the vehicle 205. In the example illustrated, a first service provider 260 is a fleet owner that owns a plurality of rental cars, including vehicle 205; the second service provider 265 is a bank that manages payments between the vehicle 205 and other service providers, such payments or invoices from the third service provider 270 (e.g., a mechanic) to the first service provider (i.e., the fleet owner).

Figure 3:
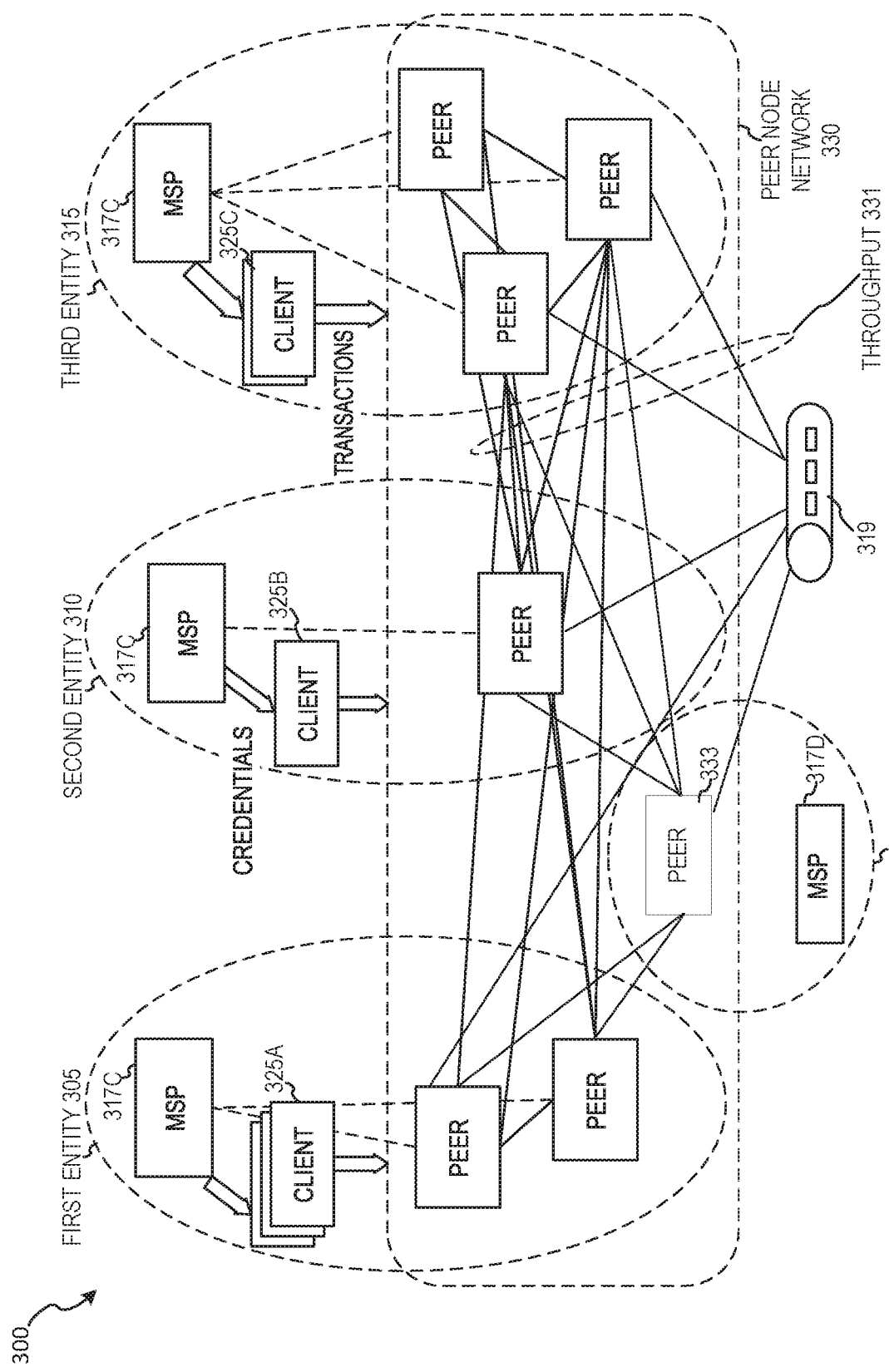
FIG. 3 shows an example blockchain network architecture for interactions between blockchain entities, according to some example embodiments.

FIG. 3 shows an example blockchain network architecture 300 for interactions between blockchain entities, according to some example embodiments. In the example embodiment of FIG. 3, four entities are displayed, including a first entity 305, such as a vehicle manufacturer; a second entity 310, e.g., a service provider such as a parking meter, toll, gas station kiosk (via smart network enabled point of sale RFID sensor), human auto-mechanic (e.g., via mobile app or web portal); a third entity 315, such as a payment processor (e.g., a bank, a payment network such as Visa, or another blockchain network such as a cryptocurrency network), and a fourth entity 320, such as the machine entity platform 147 or miner (e.g., an Ethereum miner node).

In some example embodiments, each of the blockchain entities includes a membership service provider 317A-D (MSP) that manages credentials to clients 325A-C and to nodes of a peer node network 330 that comprises a plurality of peers, such as peer node 333. Each of the entities are connected through a permissioned channel (e.g., Hyperledger channel), and different levels of data can be viewed by different entities, according to some example embodiments. For example, if the third entity 315 is a banking network, then the channel connecting the peers of the third entity 315 (e.g., banking network) may have permissions to view all data interactions with a smart contract, whereas the other entities (e.g., a car mechanic service provider) may not have access to view unencrypted messages generates by the peers of the banking network.

The clients 325A-C provide programmatic access to generate interactions (e.g., hardware appliance requests, blockchain record requests, vehicle machine account invoice) to the peer node network 330. For example, if the first entity 305 is a car manufacturer, the clients 325A correspond to vehicles (e.g., cars, trucks, autonomous cars) that can generate requests for maintenance (e.g., fuel refill, brake maintenance, etc.), which is evaluated by one or more of the peers by way of a smart contract managed by the peers. For example, peer node 333 can evaluate a request from one of the clients 325 and grant or reject the request based on fingerprint access values from the car, as discussed in further detail below. The interactions with cars (e.g., sensor data, generated requests, completed maintenance, completed payments) can be stored in an immutable chained record, such as the blockchain 319. In some example embodiments, the peers in the peer node network 330 implement a distributed consensus protocol, such as Proof-of-Work, Proof-of-Stake, or an ordering service with a pluggable consensus network. For instance, the fourth entity can manage an Apache Kafka consensus scheme that plugs into a Hyperledger Fabric blockchain network, and the peers in the peer network are Hyperledger peers. In some example embodiments, another entity controls the ordering service with the consensus scheme. For example, the fourth entity 320 can be a bank or can be a machine entity platform 147 that runs a Hyperledger ordering service to manage all payments and requests and data within the network 300. In some example embodiments, the throughput of requests transmitted to one or more of the entities is monitored as indicated by throughput 331. The amount of data transmitted to a given entity (e.g., third entity 315) can then be sequenced so as to not overload a given entity with a multitude of requests (e.g., micropayments) as discussed in further detail below.

In some example embodiments, not each entity manages a peer in the peer node network 330. For example, although in the example of FIG. 3, the second entity 310 is illustrated as comprising a peer node, in some example embodiments, the second entity comprises only a client that can generated requests to record data in the blockchain. For instance, if the second entity 310 is an auto mechanic, the client 325B can be configured as a web browser-based cloud software portal that allows the auto-mechanic to record completion of maintenance performed on a given car. In those example embodiments, the request from auto-mechanic is auto-approved for recordation to the blockchain without evaluation of fingerprint data. In other example embodiments, the requests from the auto-mechanic client are not auto-approved, and instead the fingerprint data from the car is evaluated to ensure that the requested task was completed. For instance, the auto-mechanic client may submit a record request that a given car was refueled, but the record request is not granted until the fingerprint values from the car including the gas gauge sensor indicate that refueling actually occurred.

Figure 4A:
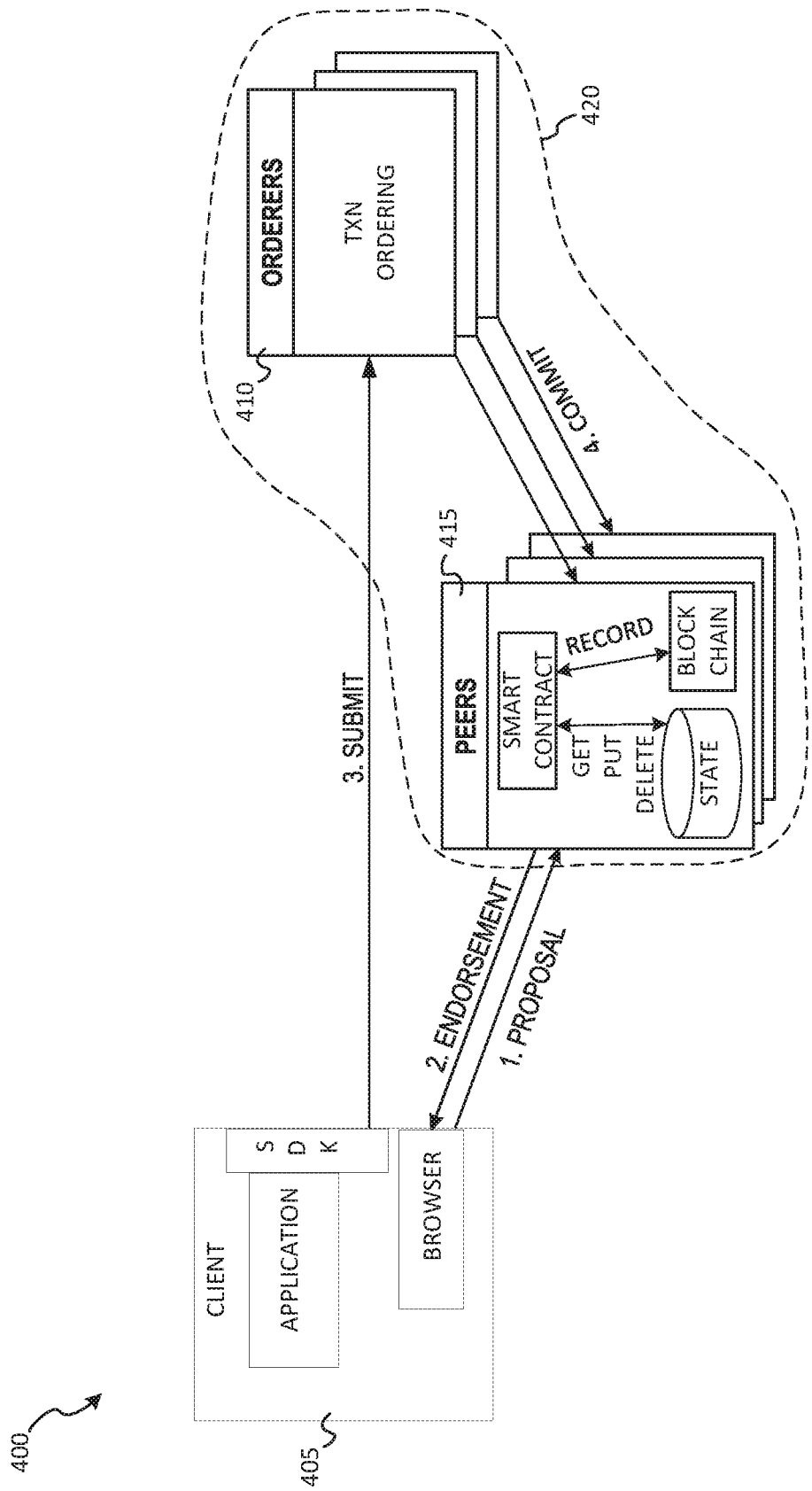
FIG. 4A shows an example blockchain runtime architecture, according to some example embodiments.

FIG. 4A shows an example blockchain runtime architecture 400, according to some example embodiments. In the example illustrated, the client 405 is a software application (e.g., mobile application with an integrated SDK) installed on a user device (e.g., a smartphone), an application installed in a hardware appliance (e.g., a smart car with an onboard computer that can generate requests), or a browser interface of cloud software (e.g., website based portal accessed through an Internet browser). The client 405 can initiate requests, such as a proposal which is submitted to a peer 415. The peer 415 (e.g., peer node 333, FIG. 3) then simulates the request to determine whether the request complies with a smart contract managed by the peer 415. For example, the peer 415 can identify what task is being requested (e.g., a service request, what type, what value) as well as authentication parameters provided by the client 405 (e.g., fingerprint data) to determine whether the request should be rejected or approved.

In some example embodiments, the smart contract is distributed amongst the peers and the smart contract is observable by any of the peers, such that participant peers have visibility into actions performed by other peers, verifiable such that the participants to a given request (e.g., transaction involving the smartcontract) can prove the agreed terms in the distributed smartcontract have been met or breached, and private such that visibility of the contents of smart contract interactions are only visible to those participant peers that are necessary to performance of the requested smartcontract interaction (e.g., via session encryption keys).

If the request conforms with the smartcontract via simulation, the request is approved and the peer 415 endorses the proposal by signing it. The endorsed proposal is then submitted by the client 405 to an orderer 410. The orderer 410 (e.g., a sub-module within hardware interaction management system 170, FIG. 1b) can implement a pluggable consensus network, such as an Apache Kafka cluster installed on Apache Zookeeper. The orderer 410 batches transactions and conveys the batched transactions to the peer 415 for inclusion in the distributed ledger. The batches constitute the block of a blockchain, where block size can vary in size based on how many transactions are to be recorded in a given block (e.g., 'BatchSize' Hyperledger parameter, specifying a quantity of messages/transactions per block, such as 10 transactions per block), or a time limit (e.g., by setting a 'BatchSize' parameter, such as: batch all transactions received within the previous 60 seconds into a block), according to some example embodiments.

The peer 415 receives the batched transactions and can reconfirm that no changes have been made to the transactions (e.g., the read-write set in the transaction to be written to state have not been modified), and if no changes are made the peer 415 records the transactions to the distributed ledger, e.g., blockchain and/or writes data to the state database for that vehicle or block object. In some example embodiments, in determining that the batched transactions are still valid, the peer 415 revalidates the fingerprint data of from the client 405 (e.g., accesses fuel gauge data to revalidate that refueling did occur) and then submits transactions to the blockchain upon revalidation.

In some example embodiments, the smart contract corresponds to the logic rules agreed upon rules between the entities (e.g., entities 305, 310, 315, 320), where the transactional data is stored in two different databases, such as a world state database and the blockchain distributed ledger. The world state database holds the latest value of a hardware appliance asset in the architecture 150. For example, a hardware appliance can be assigned a credit in a blockchain wallet machine account, which can be credited or debited based on interactions with the hardware appliance. For instance, a block object for a new car can be created, and the world state can record a bridge toll value for unlimited bridge toll payments (e.g., as evaluated through the smart contract) for the first 10,000 miles traveled by the car or for three years from data of sale (as recorded in the blockchain), whichever comes first. Then, as micropayment toll invoices are incurred, the machine account in the world state for that car is debited to reflect the current value.

In some example embodiments, application logic on the client 405 can invoke calls to interact with the smart contract managed by the peer. The calls can be invoked via web-portal (e.g., cloud service active session) or via an application with an SDK. The calls are processed by the conditional logic integrated into the smart contract managed by the peers. Example call commands include: "put", "delete", and "get", where "put" and "delete" commands are requests to change data, e.g., put or add data to the blockchain or delete data from the world state database (not delete from the blockchain as it is immutable); and the "get" command is a request to read from the world state or blockchain, and does not cause data to be modified, according to some example embodiments.

Although the example embodiment of FIG. 4A is discussed an example Hyperledger implementation, in which an ordering service and peers can be distinguished as separate entities, in some example embodiments, a miner entity 420 functions as both the peer node (that interacts with the smart contract to validate, endorse, and update state changes) and further functions as the orderer 410 in that the miner entity 420 batches up transactions based on miner's fees included with smart contract interaction requests. For example, in some example embodiments, the blockchain runtime architecture 400 is an Ethereum blockchain network, where the client 405 is a client device that submits interactions addressed to the smart contract network address, which is stored and managed by a plurality of miners such as miner entity 420, which are Ethereum miners that mine blocks of the Ethereum blockchain on a Proof-of-Work or Proof-of-Stake based consensus protocol.

Figure 4B:
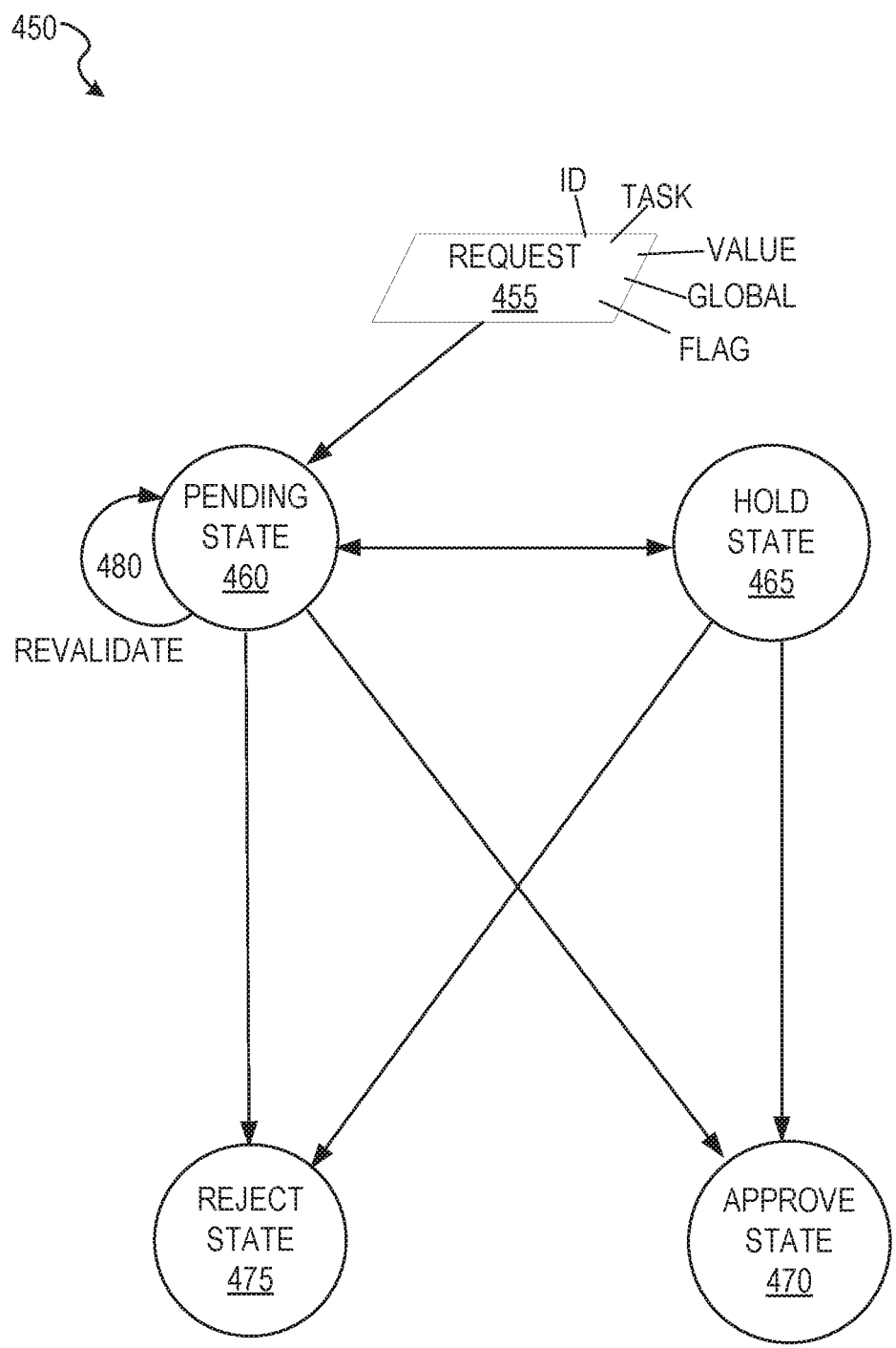
FIG. 4B shows an example smart contract finite state machine, according to some example embodiments.

FIG. 4B shows example smart contract 450 as a finite state machine, according to some example embodiments. In the illustrated example, the smart contract comprises a plurality of states including a pending state 460 in which a given request is to be initially evaluated or waiting for revalidation, a hold state 465 in which manual end-user inputs are required (e.g., manual approval of a request from an auto-mechanic user or a banking administrator), a reject state 475 in which a request is rejected as failing to conform with the pre-configured terms of the smart contract, and an approve state 470 in which the request is granted based on the interaction being requested and/or the fingerprint data.

The request data 455 includes a block object identifier (e.g., a unique ID that used to initially identify but not authenticate the vehicle for which service is requested), task data specifying one or more tasks being requested (e.g., bridge toll payment request, vehicle fuel refill, washing machine laundry detergent refill, printer ink cartridge refill), and can further include fingerprint access data that functions to authenticate that the request is for a valid entity. For example, the fingerprint data can be used to reject transactions if the fingerprint data does not meet a specified threshold, or other conditions (e.g., an existing flag condition). In the example illustrated, the fingerprint data of the request data 455 includes granular value data which can be modified incrementally and weighted, global warning data which tracks reoccurring issues, and flag data that flags errors (e.g., vehicle issues that are rare but serious when and if they arise, such as VIN-IMEI mismatch, odometer rollback). Further details of the fingerprint access data are discussed in further detail below with reference to FIG. 8.

The request data 455 can be simulated by a peer node using the smartcontract states to approve, reject, place on hold, or other actions, such as revalidation. For example, assume the smart contract 450 specifies that automatic approval of transactions involving less than $50 require a fingerprint granular value data of a vehicle to be above 7, and further assume that the request data 455 is for a refill service request and the fingerprint data indicates the vehicle has a fingerprint value of 9. In this example, the request data 455 enters the pending state, which is a queue within the peer node. Upon validation, the peer node can ascertain that the refill request is for 5 gallons of fuel, and that the vehicles fingerprint value is 9, which is over the specified threshold. In response, the peer node transitions the request to the approve state automatically, without further human user approval required. In some example embodiments, even if the conditions are satisfied (e.g., below the price amount, above the fingerprint threshold), the request remains in the pending state 460 until revalidation 480 occurs (e.g., reconfirmation of fuel added). In some example embodiments, the revalidation 480 is implemented as a cycle, or a time delay loop (e.g., wait one hour, then attempt revalidation), while in other embodiments, the revalidation is event driven, for example by implementing Key-Value Observing objects (KVOs) that monitor the fuel state property of the car's block object and in which revalidation is triggered upon a KVO indicating the fuel state property has changed.

As an additional example, assume that the smart contract requires manual approval if a global warning value indicates a reoccurring issue with the requesting object (e.g., the car) or requires manual approval if an error flag is raised. For example, if the request data 455 indicates that the odometer flag value is set (e.g., indicating the odometer has been rolled back), the smart contract transitions into the hold state 465 which requires manual human user inputs of approval (e.g., via user interface buttons) to approve the request and transition to the approve state 470, the rejection state 475, or the pending state 460 (e.g., for revalidation 480 at a later time). Additional request rules can be configured into the smart contract finite state machine 450 as required per different classes of hardware device. For example, a smart laundry machine may have an electricity usage sensor, where the average electricity usage value over the past month is used to prove the laundry machine is environmentally friendly and requests from laundry machines that are not environmentally friendly are automatically rejected, based on those machine's electricity usage exceeding a value set in the distributed smart contract.

Figure 5:
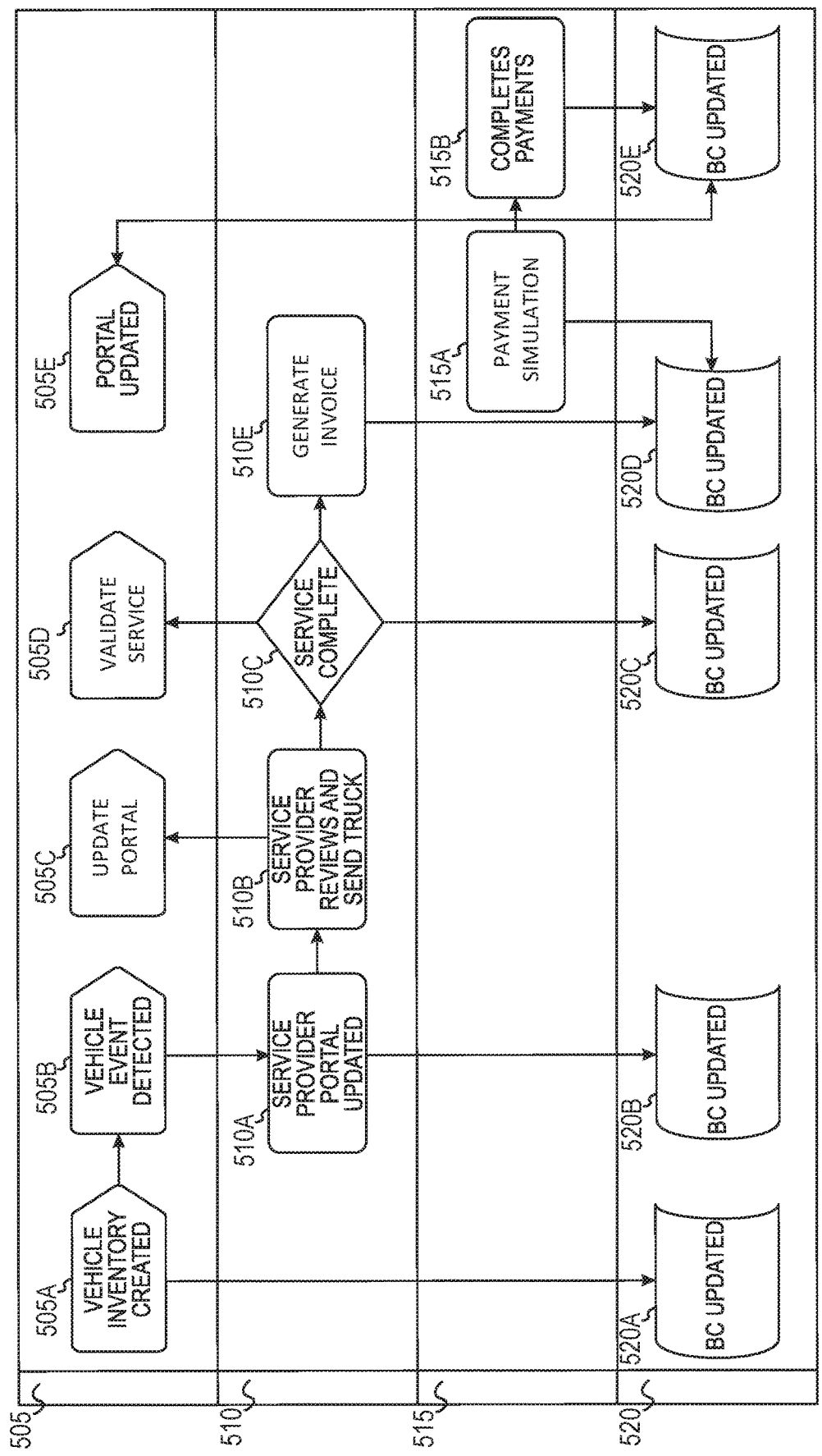
FIG. 5 shows a network lane diagram for interactions between different entities, according to some example embodiments.

FIG. 5 shows a network lane diagram 500 for interactions between different entities of the network, according to some example embodiments. In the illustrated example of FIG. 5, a hardware interaction system 505 (e.g., hardware interaction system 170, fourth entity 320) performs operations 505A-505E, a hardware appliance service provider 510 (e.g., auto-mechanic, refrigerator repairperson, second entity 310 or third entity 315 in FIG. 3, hardware appliance service provider 130, a car manufacturer or fleet owner, etc.) performs operations 510A-510E, a payment processor entity 515 (e.g., a banking entity, third-party Bitcoin exchange site, an accounting department within a company, third entity 315 in FIG. 3) performs operations 515A-515B, and a blockchain entity 520 (e.g., a component or Kafka-based ordering service managed by hardware interaction system 170 in FIG. 1B, fourth entity 320 in FIG. 3, an external miner such as an Ethereum miner) performs operations 520A-520E.

At operation 505A, the hardware interaction system 505 creates a vehicle inventory for management by the machine entity platform (e.g., machine entity platform 147). For example, a fleet of rental cars are input as blockchain objects for management, where each rental car has sensors or parameter data (e.g., vehicle identification number (VIN), international mobile equipment identity (IMEI)) used to generate respective fingerprint access values. Further, each of rental fleet car objects are recorded as blockchain fingerprinted access objects at operation 520A by blockchain entity 520.

At operation 505B, a vehicle event is detected and recorded in the block object for the vehicle at operation 520B. For example, one of the rental cars submits a service request for fuel refill in response to the fleet owner or vehicle itself triggering a fuel request.

At operation 510A, the service provider portal is updated. For example, a web-portal user interface of an auto-mechanic indicates that one of the rental cars needs a fuel refill. At operation 510B, the service provider performs the service (e.g., refuel) and the portal user interface, at operation 505C, displays a pop-up notification to indicate that the vehicle is being serviced. After servicing, the service provider selects a completion button in the web-portal UI at operation 510C. Further, upon completion of the service, a notification or record indicating that the service is complete is recorded in the blockchain at 520C and further a notification is transmitted to the hardware interaction system 505, which accesses the fuel gauge sensor of the car at operation 505D and validates that service is completed (e.g., as indicated by the fuel gauge indicating fuel was added to the tank). The validation information is also recorded at operation 520C within the blockchain.

Upon completion of the task, the service provider generates an invoice for payment at operation 510E, which is transmitted to the payment processor entity 515 at operation 515A for simulation. At operation 515A, the payment processor entity 515 access the blockchain data to confirm that a valid service was requested (e.g., in response to an event, at operation 505B), and further confirms that service is complete via the data recorded in the blockchain at operation 520C. In some example embodiments, the simulation is performed by a peer node managing the smart contract and upon the simulation being completed, the payment request is endorsed (e.g., cryptographically signed) by the payment processor entity 515 and recorded at operation 520D. At operation 515B, the payment entity completes payment operation 515B and records payment completion at operation 520E in the blockchain ledger and the portal is updated (e.g., pop-up notification) at operation 505E. In some example embodiments, the mechanism for payment is external to the operations of FIG. 5, for example, the payment processor entity 515 may send a physical check via postal mail, transfer payment electronically (e.g., PayPal, Visa, perform a wire transfer), then record that payment is completed at operation 515B. In some example embodiments, payment is completed via a blockchain token managed by the blockchain entity 520. For example, the token can be an Ether token (e.g., a cryptocurrency unit of the Ethereum network) and the blockchain entity 520 transmits payment in Ether tokens from an account managed by the payment processor entity 515 to the hardware appliance service provider 510 or to a machine account of the vehicle (as tracked in the world state data for the vehicle).

Figure 6:
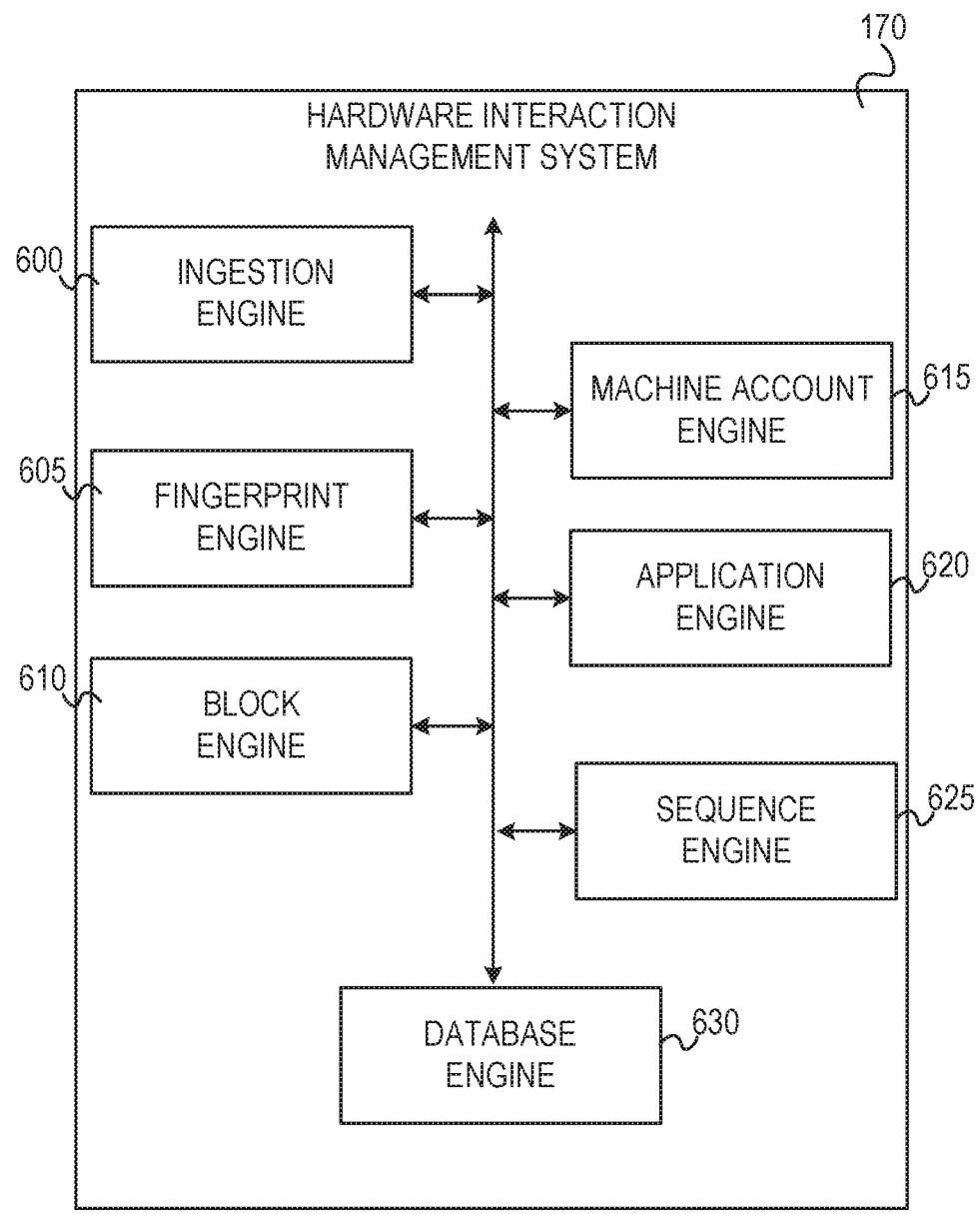
FIG. 6 shows example functional engines of an interaction system, according to some example embodiments.

FIG. 6 shows example functional engines of the hardware interaction management system 170, according to some example embodiments. To avoid obscuring the inventive subject matter with unnecessary detail, various functional components (e.g., engines) that are not germane to conveying an understanding of the inventive subject matter have been omitted from FIG. 6. However, a skilled artisan will readily recognize that various additional functional components may be supported by the hardware interaction management system 170 to facilitate additional functionality that is not specifically described herein.

As is understood by skilled artisans in the relevant computer arts, each functional component (e.g., engine) illustrated in FIG. 6 may be implemented using hardware (e.g., a processor of a machine) or a combination of logic (e.g., executable software instructions) and hardware (e.g., memory and processor of a machine) for executing the logic. Furthermore, the various functional components depicted in FIG. 6 may reside on a single computer (e.g., a laptop), or may be distributed across several computers in various arrangements such as cloud-based architectures. Moreover, any two or more modules of the hardware interaction management system 170 may be combined into a single module, or subdivided among multiple modules. It shall be appreciated that while the functional components (e.g., engines) of FIG. 6 are discussed in the singular sense, in other embodiments, multiple instances of one or more of the modules may be employed.

As illustrated, the hardware interaction management system 170 comprises an ingestion engine 600, a fingerprint engine 605, a block engine 610, a machine account engine 615, an application engine, a sequence engine 625, and a database engine 630. The ingestion engine 600 is configured to retrieve hardware appliance data from the hardware appliances (e.g., via a sensor interface) or from third party network sites. The fingerprint engine 605 is configured to generate fingerprint access data for each of the hardware appliances. The block engine 610 manages a blockchain interactions (e.g., a peer node, a consensus-based ordering service). The machine account engine 615 manages tracking an asset value which can be credit or debited as tasks (e.g., service requests) are processed. The application engine 620 is configured to generate user interfaces which can be displayed to clients of the hardware interaction management system 170. The sequence engine 625 is configured to monitor throughput of network traffic to one or more entities interfacing with the hardware interaction system 170 and sequence traffic transmitted to the entities based available throughput, as discussed in further detail below. The database engine 630 manages non-blockchain based data for the hardware appliances, e.g., in a relational database management system such as database 245 which can track hardware appliance IDs and user accounts for clients, according to some example embodiments.

Figure 7:
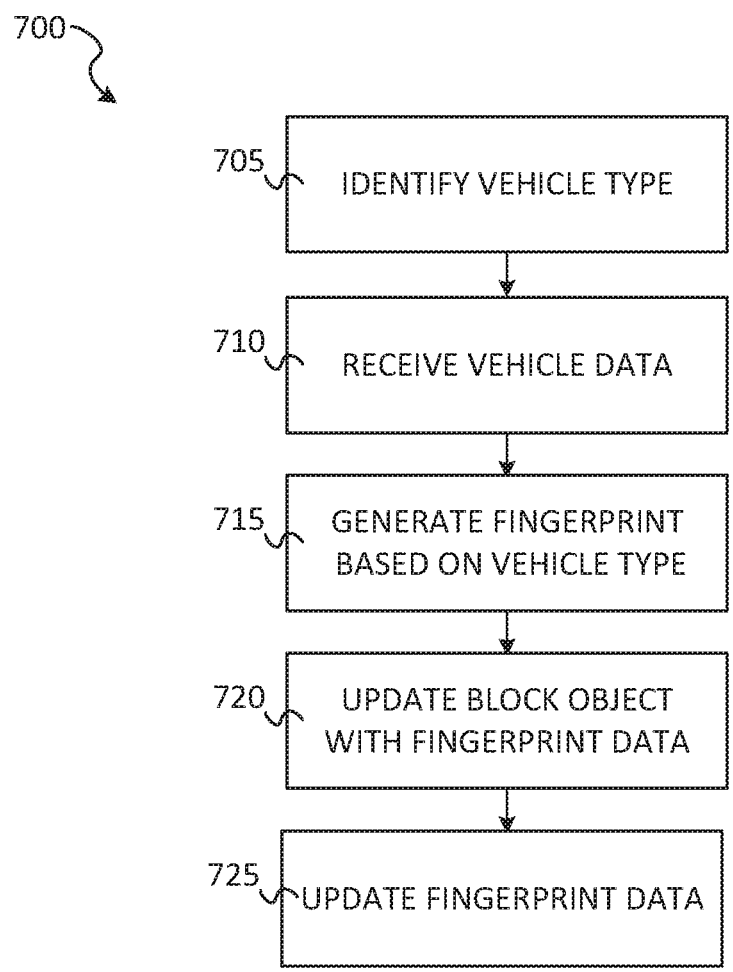
FIG. 7 shows a flow diagram for an example method for managing a fingerprint access value for a hardware appliance, according to some example embodiments.

FIG. 7 shows a flow diagram for an example method 700 for generating and managing fingerprint access data for a hardware appliance, such as a car, according to some example embodiments.

Figure 8:
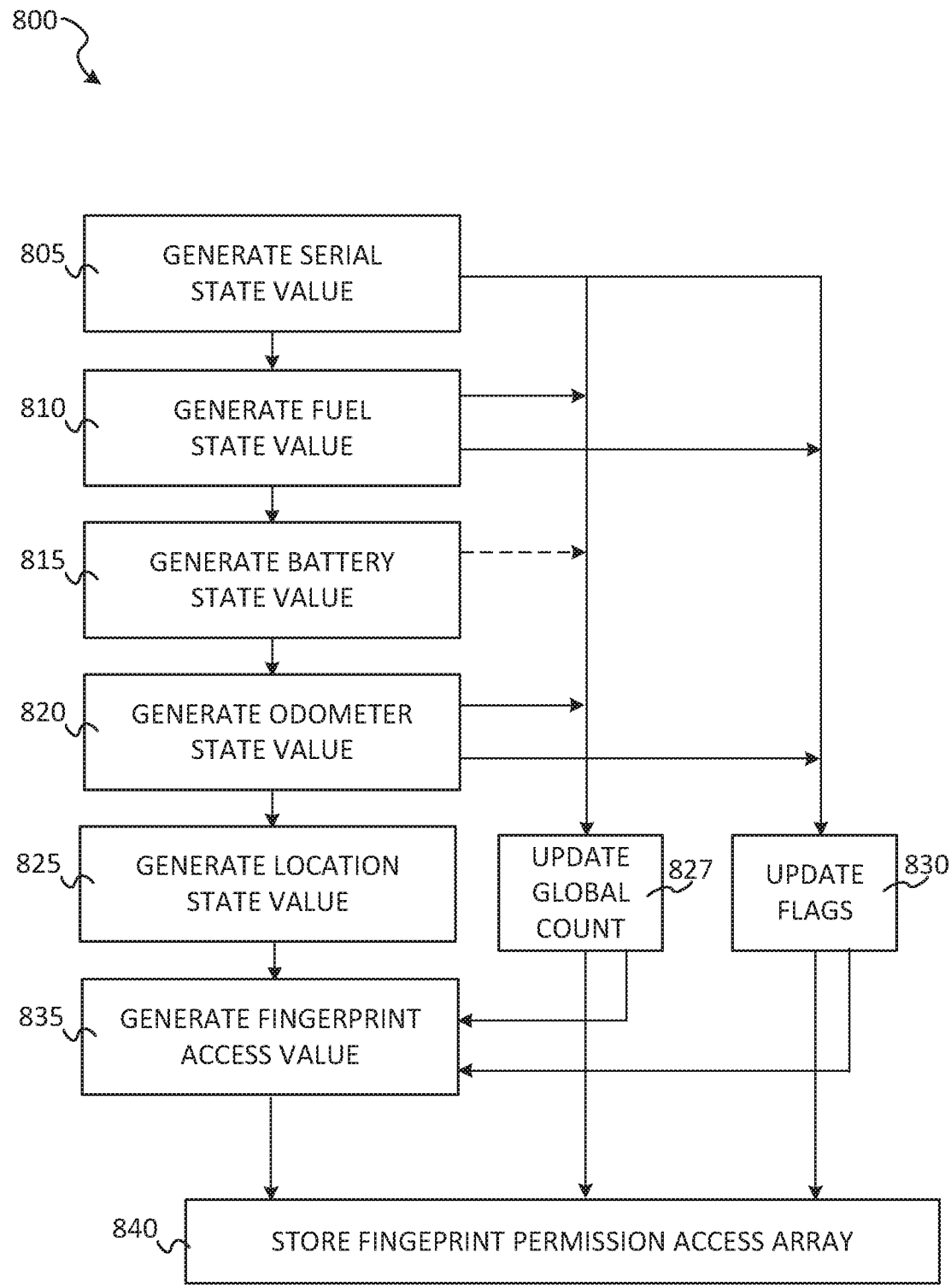
FIG. 8 shows a flow diagram or example method for generating a fingerprint permission access value, according to some example embodiments.

At operation 705, the ingestion engine 600 identifies a vehicle type for which fingerprint access data is to be generated. In some example embodiments, which data values are included to generate a fingerprint access value for a given vehicle is based on the given vehicle's type (e.g., year, make, model), because different vehicles have different configurations and operational parameters (e.g., different types of sensors, quantity of sensors, different serial data, etc.) For instance, if the fingerprint access value is generated for a modern luxury coupe, then all five data points discussed in FIG. 8 are utilized to generate the fingerprint access value for the modern luxury coupe because modern luxury coupes generally have the latest technology with a large amounts of sensors. Whereas, for example, a 1997 pickup truck may only have an odometer reading that can be recorded via a physical OBD plugin, and thus only the mileage state value may be used to generate the 1972's pickup truck's fingerprint access value.

At operation 710, ingestion engine 600 receives vehicle data such as sensor data, log data, or third-party website data. In some example embodiments, the fingerprint access value is generated from different data points provided through the vehicle's data interface, e.g., the vehicle's telematics interface. The data interface can be integrated into the vehicle itself (e.g., integrated into a car's computer system) or be implemented as a plug-in module (e.g., a physical device that can be plugged into a vehicle's OBD port to continually record and upload data to the system 170).

At operation 715, the fingerprint engine 605 generates fingerprint access values based on the identified vehicle type (e.g., based on available state sensor data points available for that vehicle type). The fingerprint access value for a given vehicle indicates the vehicle's trustworthiness in the network architecture 150. For instance, the fingerprint access value functions as a signature value (e.g., digital signature), derived from vehicle data, that functions to authenticate the vehicle and demonstrate that a given service request is originating from the vehicle it claims to be, where the level of access is granted or rejected based on the type of request being generated (e.g., transactional amount for the request) and pre-set smartcontract values managed by the smart contract. In some example embodiments, each vehicle data point used to generate the fingerprint is weighted (e.g., from 1 to 10) using preconfigured weights that are based on the individual data point's usefulness in authenticating the vehicle. For instance, in some example embodiments, the odometer reading is preconfigured with a high trust weight (e.g., 7, 8, 9, 10), as the odometer value should be incrementing as a function of time, which is a pattern that is consistent and difficult to spoof. Whereas fuel-level readings can be preconfigured with a lower weight because fuel-level data fluctuates, and is somewhat more noisey and less consistent, and thereby less useful in authenticating the vehicle. For instance, it is unlikely that a given vehicle's mileage will jump from 50,000 miles down to 20,000 miles or up to 80,000 miles in normal operating conditions. Thus, a service request from a car with an odometer reading that has been rolled back 30,000 miles or increased 30,000 miles overnight is likely fraudulent. Whereas, just because a vehicle's fuel-level reading is not consistent with the car's past data does not necessarily mean the car has been manipulated: the anomalous fuel-level readings may be due to a valid fuel pump problem, which does not impugn the car's authentication or trustworthiness within the architecture 150.

In some example embodiments, the gathering and usage of the different types of vehicle data can vary. For instance, the VIN state value can be updated once per day as a vehicle's VIN data does not vary often, whereas the odometer reading may be pulled from the vehicle to update the fingerprint access value multiple times per day as the odometer reading increases per distance travelled.

In some example embodiments, each type of vehicle state data is analyzed using three elements, including (1) a granular value data score, which is the sum of all the granular data points multiplied by a weight for that data type, (2) a global warning running value, which is the quantity of times a risky occurrence is detected over a longer time span (e.g., one week) or a longer record span (e.g., within the last 100 records), or from multiple different types of sensor data (e.g., data from the fuel sensor, and data from the tire pressure sensor, and (3) an error or rejection flag, which is a flag that can be triggered when a preconfigured condition is detected for that given state data point type.

As an illustrative example, assume the hardware appliance is a car with two types of data points used to generate the fingerprint access value: a VIN state value that analyzes the car's VIN data, and a fuel level state value that analyzes the car's fuel gauge readings. An example table is displayed below, though it is appreciated the table is merely an example of data algorithmically generated via looping control operations (e.g., a for loop for each class of vehicle data type to be analyzed), and no tables need be generated to generate the fingerprint access values.

TABLE 1

| State Type | Initial Value | State Weight | State Maximum | Current State Value |
|---|---|---|---|---|
| VIN | 10,000 | 0.8 | 8,000 | 8,000 |
| Fuel | 10,000 | 0.2 | 2,000 | 500 |
| | | | 10,000 | 8,500 |

In the above table, the first column lists the state data type for that row, such as any sensor data or parameter data (e.g., VIN data, serial data, log data) derived from the hardware appliance. The initial value row lists the initial state value for each state data type. The state weight column lists pre-configured usefulness weightings that attenuate values based on how useful the data type is in authenticating a vehicle. The state maximum column lists a state value maximum value obtainable for that state data type per the weighting (e.g., for VIN, 10,000 is multiplied by the 0.8 weight to yield a maximum usefulness of 8,000 for VIN state data). The current state value is the state value for that car, which is created granular value algorithm for that data type. For example, with reference to the VIN row, the initial value is weighted from 10,000 to 8,000 (as multiplied by 0.8), due to VIN records being generally trustworthy but not dispositive in a car's identity. Further, the car's VIN records are then analyzed, and the 8,000-state maximum can be reduced or kept the same based on granular increments (e.g., decrementing from 8,000 by 1,500 for each VIN record that does not match its value from a previous VIN record). In the example in the table, the VIN records for the car did not necessitate the State Maximum value be modified, thus the car's state value for the VIN state data point is 8,000. In contrast, the fuel data type is weighted down to 2,000 maximum as fuel levels are less useful in authenticating the car due their dynamic noisey nature. Further, the vehicle's state maximum was decremented from 2,000 to 500, which are due to granular adjustments. The two current granular values are then added together to yield a granular total value 8,500 which is measured against the total state aggregate value of 10,000 (8,000 from the VIN row, and 2,000 from the fuel row). For instance, the score of the vehicle can be expressed as a percentage or ratio: 85/100, which is then stored as the car's fingerprint access score. Additional detailed examples of modifying the fingerprint to yield the Current State Value for a given data type are discussed below with reference to FIG. 8 below.

Continuing, at operation 720, the block engine 610 updates a block object for the vehicle, where the block object includes the fingerprint access data. In some example embodiments, each block object is identified by a block object identifier, which functions as a unique identifier for a given block object that tracks a given hardware appliance (e.g., vehicle). That is, for example, a first block object can be created for a first autonomous vehicle, where the first autonomous vehicle has a first unique identifier (e.g., "0001") and one or more items of fingerprint data (e.g., 77/100, "0" global values, "0" flag value), a second block object can be created for a second autonomous vehicle, where the second autonomous vehicle as a second unique identifier and one or more items of fingerprint data (e.g., 77/100, "0" global values, "0" flag value). The unique identifier can be used to initially identify what vehicle is involved in a given transaction. However, mere submission of a given vehicle's block object identifier may not authorize or validate the request; rather, the fingerprint data is computed and compared against overall data for that vehicle to continuously validate the vehicle in a secure manner that is difficult to defraud. That is, whereas a credit card number is used by past approaches to approve a task, the unique identifier here is merely used to initially track records, and the authentication and approval of a given task is performed via the fingerprint data, which is continuously updated at operation 725 using hardware appliance provided data.

FIG. 8 shows a flow diagram or example method 800 for generating fingerprint access data, according to some example embodiments. The method 800 is an example subroutine function that can be called by operation 715 of method 700. Upon invocation, method 800 executes additional sub-routines to generate a plurality of vehicle fingerprint data points, which are combined to generate the fingerprint access value which is returned or otherwise stored in memory upon completion of the subroutine function.

Within each of operations 805-825 the granular value data is modified by a custom granular scheme for that data type (decrementing 1,500 for each anomalous VIN record), and at the end of operation 825, the five stored granular data values are combined at operation 835 to generate the fingerprint access value (e.g., 91/100 in FIG. 12C), according to some example embodiments. Further, at each of the operations 805-825, if a global warning condition is met, then the global count data is updated at operation 827, and if a flag condition is met for that state data type, then the flag data is updated at operation 830. The global warning count data and the flag data can then be used to modify the generated aggregated score (decrement the granular data by 5,000 if a flag exists), or stored as separate values at operation 840 (e.g., a tuple comprising: a granular score, global count value, and flag value) which can be used to grant or authorize different requests by the smart contracts on-chain. For instance, the smart contract can specify automatic rejection of a task if a global warning count surpasses a specified threshold, where the global warning count is analyzed as a data value separate from the granular score data.

A detailed example for each of the operations is here discussed, but it is appreciated that the values mentioned are examples, and can be differently configured or specified based on different data types available or hardware appliances.

At operation 805, the fingerprint engine 605 generates a serial state value. The serial state authenticates the vehicle based on the vehicle's identifiers, such as a license place, VIN number, manufacturer code/model, or other numerical identifiers. In some example embodiments, the granular serial state value is performed by: first setting the initial value of the granular serial state value to 10,000; followed by retrieving the last 20 days worth of serial data (e.g., last 20 days worth of VIN records pulled from car, last 20 days of VIN-IMEI combination pair data pulled from car); followed by decrementing 10,000 by a preset amount for each of day that is missing serial data (e.g., decreasing 500 points for a first data of missing VIN data, decreasing an additional 500 for a second day of missing VIN data, or decrementing by 500 for each data in which the VIN-IMEI combination changes); reducing the resulting value by the serial weighting (e.g., reducing by multiplying by 0.8), and storing the resulting value.

An example global warning parameter includes: incrementing the global warning counter at operation 827 if the quantity of serial data changes surpasses a threshold. For example, if the VIN-IMEI combination changes more than five times in the past week, then increment the global warning count for the vehicle at operation 827.

An example rejection flag parameter includes: set a rejection flag at operation 830 if the VIN or VIN-IMEI pair changes in the first 10 records for the vehicle (e.g., the first 10 records in the block object for the given vehicle).

At operation 810, the fingerprint engine 605 generates a fuel state value. For example, the last few thousand fuel gauge readings for the vehicle are accessed and measured against the corresponding odometer data for each fuel gauge reading to determine whether the increase in mileage is congruent with the decrease in the fuel level. For example, the initial value can be set to 0 instead of 10,000, and for each fuel record (in the last few thousand) that decreases in proportion to the odometer increase, add an increment (e.g., 500) to the initial value.

As an additional example, a fuel usage metric (e.g., miles per gallon, mpg) can be accessed directly from the vehicle sensor interface, and for each increase in mileage, divide by the mpg to determine expected gallons of fuel used, and if the actual fuel is within range (e.g., 30%) of the expected fuel used, then add 500 to the initial score. For instance, if a coupe traveled 100 miles and the vehicle interface sensor uploaded a 10 mpg value, then the 100 range is divided by the mpg value to indicate an expected fuel reduction value of 10 gallons.

An example global warning parameter includes: incrementing the global counter at operation 827 if the amount of fuel used is negative too many times within a set time span. For example, if the fuel used compared to the distance traveled is negative (e.g., a fill up occurred) more than 5 times in one day, then increment the global counter at operation 827.

An example rejection flag update includes: set a rejection flag at operation 830 if there is an incomplete seal in the fuel system (gas cap issue), or if the vehicles ignition is activated while refueling.

At operation 815, the fingerprint engine 605 generates a battery state value. For example, the last 30 days of battery data for the vehicle is averaged and compared against the last 24 hours worth of battery data to determine whether the last 24 hours of battery data is within margin of the average value from the last 30 days. For example, set the initial value to "0" and check each of the last 24 hours, and add 415 points for each hour that is within 20% of the 30-day average.

Further, as shown in FIG. 8, each of the data points measured may or may not have contributions to the global count and error flag. For example, the battery data may have a global counter value to be tracked as indicated by the dotted line extending from operation 815 (e.g., change in battery voltage by more than 50% indicating a fraudulently swapped battery), but there is no contribution from operation 815 to flag data memory value updated and managed via operation 830. This can be due to not all car issues having an effect on the car's trustworthy-ness. For example, the battery may be dead from the lights being left on, which is a mechanical issue that may decrement the granular value data for the car, but it is not a car authentication issue that is serious enough to set a rejection flag at operation 830.

At operation 820, the fingerprint engine 605 generates an odometer state value. For example, starting from an initial value of 0, increment 500 for each 10th odometer reading that is positive in value (indicating that a positive distance was traveled by the car). An example of a global warning value from the odometer state value of operation 820 is incrementing the global warning counter if the distance travelled value is negative (indicating possible odometer rollback). An example odometer flag set can include if the odometer has been rolled back more than a pre-set amount (e.g., 5,000 miles) over any amount of time.

At operation 825, the fingerprint engine 605 generates a location state value. For example, the last 10,000 GPS readings from the vehicle are identified, and the speed is calculated from the latitude/longitude and corresponding time data; followed by decrementing an initial value of 10,000 for every other reading indicating the car was likely traveling over a pre-configured speed (e.g., 100 miles per hour).

An example of a global warning parameter from the location data includes increasing the global counter at operation 827 if the pre-configured speed was exceeded a pre-set amount (e.g., more than 100 miles per hour, more than twenty times per month). An example rejection flag from the location data includes setting a rejection flag if the vehicle location changes more than a pre-set distance per day (e.g., if the car travels more than 1000 miles in 2 hours, set a flag at operation 830).

At operation 830, the fingerprint engine 605 generates a granular vehicle permission access value from the generated granular state values. For example, at operation 830, the fingerprint engine aggregates each of the granular state values generated from the operations 805-825 to generate an aggregate value (e.g., 8,500 in the example using the table above), which is then stored as the fingerprint access value for the vehicle.

In some example embodiments, the global warning data and the flag data is used to modify the granular score value. For example, for each count in the global counter, decrease by a large value (e.g., larger than is used to increment in the granular operations). In some example embodiments, the global counter data is analyzed to determine if a global threshold is met, and if and only if the global threshold is met is the global counter values utilized to decrement the aggregated granular scores. For example, if there are three or more global counts stored, then decrement 2,000 from the aggregated granular scores for each global count over three, otherwise do not change the aggregated granular score (e.g., if the global warning count is less than 3).

In some example embodiments, anytime there is one or more global flag set at operation 830, the aggregated score is set to a pre-configured low value: 1,000 out of 10,000.

In some example embodiments, the global warning counter data and the rejection flag data is not used to modify the aggregated granular score data. Instead, the fingerprint granular access value, the global warning count, and error flag data are stored as tuple or array at operation 840. In these example embodiments, smartcontracts managed by the architecture 150 can specify conditions using the three fingerprint data items, such as authorize a certain request only if no flag data is set, or reject any transaction if the fingerprint access value is below some set threshold.

Figure 9:
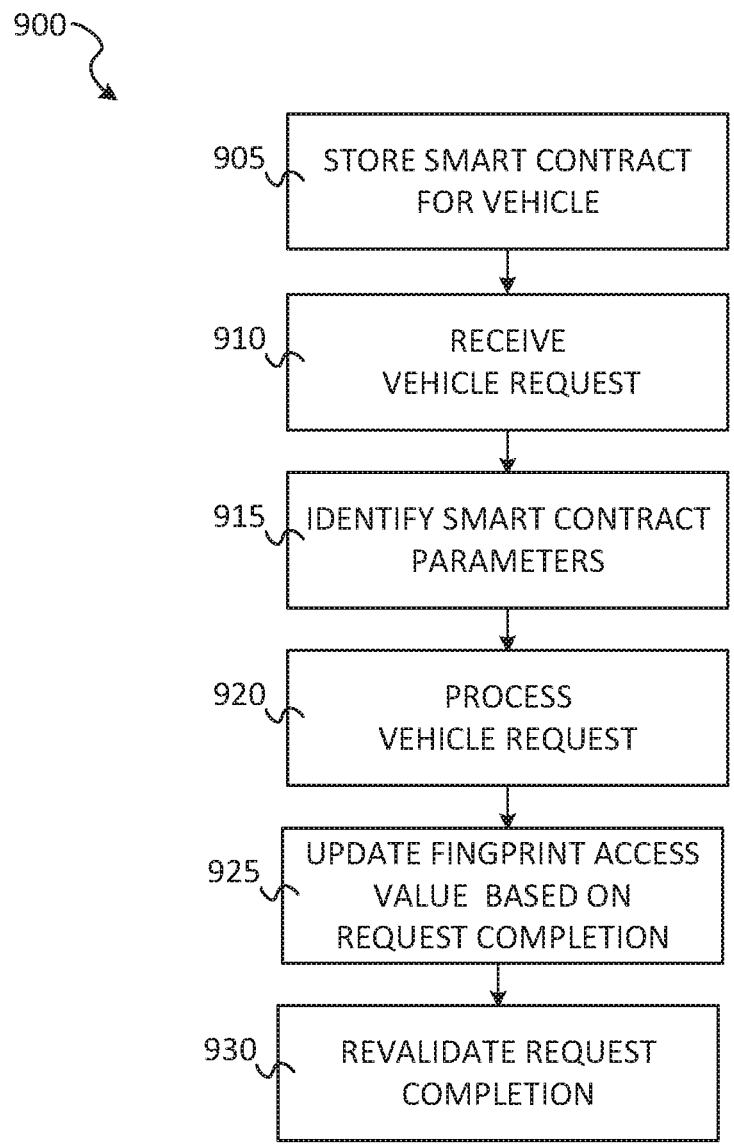
FIG. 9 shows a flow diagram of an example method for managing a vehicle request using fingerprint access data for a hardware appliance, according to some example embodiments.

FIG. 9 shows an example flow diagram of an example method 900 for managing a vehicle request using a smart contract fingerprint access values for the vehicle, according to some example embodiments. At operation 905, the block engine 610 stores the smart contract for vehicle. For example, the block engine 610 distributes a pre-configured smart contract to multiple block chain entities for processing via peer nodes. At operation 910, block engine 610 receives a vehicle request from the client (e.g. request generated by a vehicle, a request generated by a client using a web browser portal). At operation 915, the block engine 610 identifies a smart contract states and parameters, as discussed in FIG. 4B above. At operation 920, the block engine 610 processes the vehicle request based on the smart contract parameters and the fingerprint data generated for the vehicle. At operation 925, the block engine 610 updates fingerprint access value database on the request being completed. At operation 930, block engine 610 revalidates that the requested task has been performed, e.g., by access sensors of the vehicle.

Figure 10:
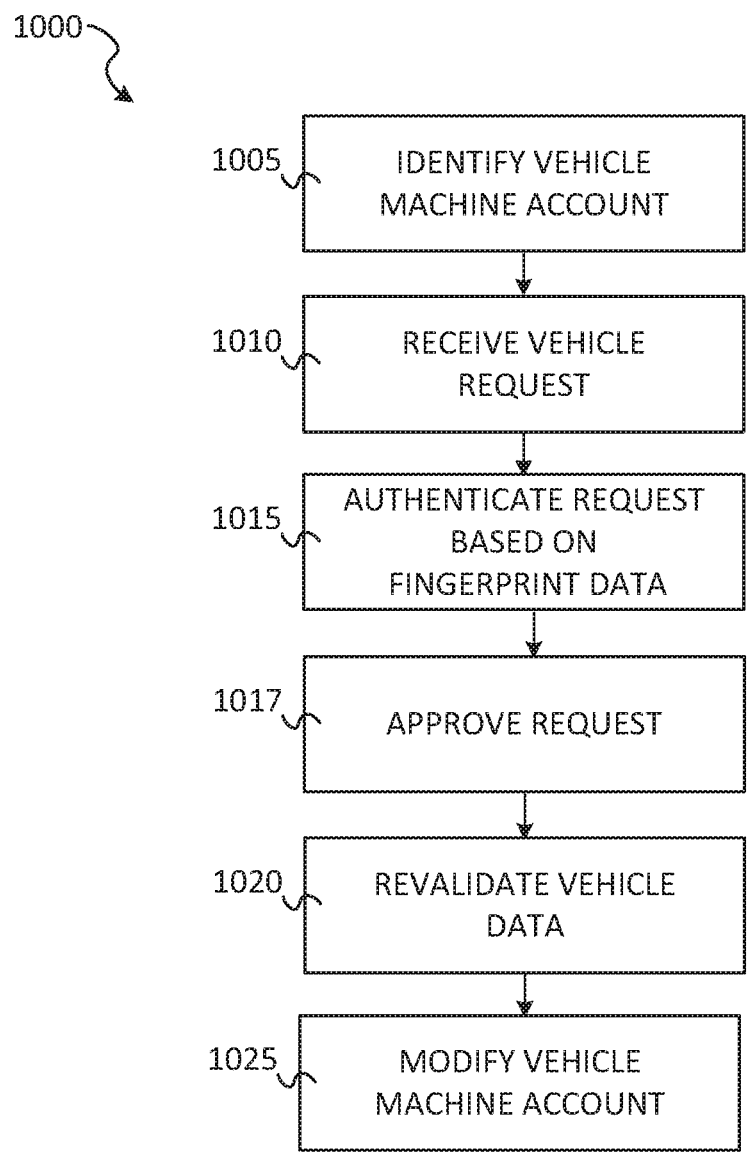
FIG. 10 shows a flow diagram of an example method for managing machine accounts using the architecture, according to some example embodiments.

FIG. 10 shows a flow diagram of an example method 1000 for managing machine accounts using the architecture 150, according to some example embodiments. As an illustrative example, the machine account is discussed as a fuel credit that is updated as the vehicle consumes fuel. For example, a car manufacturer can manufacture a V8 luxury coupe and sell the coupe with an integrated "Free Gas for the first 10 years or $15,000 dollars, whichever is incurred first" deal, that functions as a credited data value that is managed via a machine account of a block object created for the coupe and managed by the architecture 150. The machine account deal for fuel is thus integrated with the car, and is sold to the end-user. As the car incurs miles, fuel transactions or microtransactions are created, and authentication via the vehicle's fingerprint data is performed, and the fuel paid for against or by debiting the vehicle's machine account for that purpose (e.g., refueling). In this way, the machine account can is tied to the vehicle with little to no maintenance by the manufacturer for downstream owners. For example, the luxury coupe can be transferred from a first end-user to a second end-user after the first year and the fuel machine account is transferred with the car with no title updates required. That is, the second user does not have to prove they own the car; rather, requests for fuel are validated based on the car's fingerprint data (e.g., from sensor data), which is agnostic to end-user title records. In some example embodiments, the machine account is pre-credited by the manufacturer by paying a payment processing entity of the architecture 150 (e.g., the third entity 315 in FIG. 3). In other example embodiments, the obligation for the manufacture to pay for the coupe's gas is recorded within the smart contract logic managed by the peers. For example, instead of prepayment of $15,000 to the coupe's block object machine account, the smart contract can be configured with automatic approval logic that approves fueling requests that are auto-paid by the car manufacturer within the specified terms (e.g., within the 10 years, or less than $15,000 worth of fuel used). Further, in some example embodiments, the blockchain architecture 150 incorporates a cryptocurrency token (e.g., Bitcoin, Ethereum's Ether, or tokens specifically created for the manufacturer channel within network 150) and the fuel payments are debited as tokens from the machine account for the coupe, which is functions as a permanent blockchain wallet for the vehicle. For example, the machine account can have a public key of an Ethereum based wallet, to which the car manufacturer deposits $15,000 worth of tokens, which are used for future payments with little to no maintenance or interactions from the car manufacturer. That is, the car manufacturer can agree to logic in the contract, then deposit value to the machine account for the car, then transactions (e.g., microtransactions) are automatically handled without future supervision from the manufacturer.

Although fuel refill credit is discussed here as an example, it is appreciated that the machine account stored in the world state for the block objects (e.g., hardware appliances) can be configured for other baked-in machine account credits, including, for example: car insurance pre-paid for by the car's manufacturer (thereby alleviating dealer legal requirements and burden), free ink for the life of an inkjet printer, free paid bridge tolls for the life of a vehicle, free downtown parking within a preset geofenced area (e.g., within Downtown San Francisco) for the life of the vehicle.

However, not all integrated deals need be baked in at the outset of the hardware appliances creation. For example, the machine account can be refill-able by different entities, such as a car's current owner. For instance, the coupe's owner can transmit 4,000 cryptocurrency tokens to the machine account's public key (payment address), and the deposited tokens can be used to pay for various car interactions, such as paying incrementally for high-quality streaming radio, paying for tolls, paying meters, where said services have integrated SDKs that submit transactions authenticated, validated, and revalidated as discussed above. Further, as discussed, when and if the user sells the car, the token's deposited to the machine account's public key are transferred with the car automatically. In this way, for example, a third owner of a user German coupe can deposit tokens to the public key address of the car's machine account for known conditions (e.g., bad tires) so that the fourth user can simply buy the user German coupe and service the car using the deposited tokens.

Continuing, at operation 1005, the block engine 610 identifies a vehicle machine account. For example, the block engine 610 identifies an existing machine account in the world state data or creates a new machine account for the block object of the vehicle. At operation 1010, the block engine 610 receives a vehicle request. The request can include the vehicle's unique identifier (e.g., unique identifier for the vehicle on machine entity platform 147, and/or a digital signature generated by the vehicle using a private key integrated in the vehicle), fingerprint access data, and specification of one or more tasks requested (e.g., fuel refill, insurance debit amount based on miles recently travelled), according to some example embodiments.

At operation 1015, the block engine 610 authenticates vehicle request for the vehicle. For example, at operation 1015 the block engine 610 authenticates the vehicle based on vehicle's fingerprint access data (e.g., validating the vehicle's fingerprint data is valid per the requested transactions and per the logic of the pre-configured smart contract). In some example embodiments, the block engine 610 authenticates the vehicle based on the vehicle's fingerprint data and further based on the request including a valid digital signature from the vehicle (e.g., generated using the private key stored on the car, where the digital signatures can be validated using the corresponding public key).

At operation 1017, the block engine 610 approves the request. For example, a refueling request is preliminarily approved contingent upon on re-validation that fueling occurred.

At operation 1020, the block engine 610 revalidates the request by accessing the fuel gauge sensor of the vehicle to confirm that the fuel tank amount has increased by the correct amount of fuel (e.g., the amount specified in the request of operation 1010).

At operation 1025, the block engine 610 modifies the vehicle block account based on the request and the vehicle fingerprint data authenticating the vehicle for the request level. For example, after revalidation, the vehicle's machine account is debited to reduce the amount in the machine account. Alternatively, at operation 1025 an invoice for payment is generated for payment by another entity (e.g., the car manufacturer, first entity 305 in FIG. 3).

Figure 11:
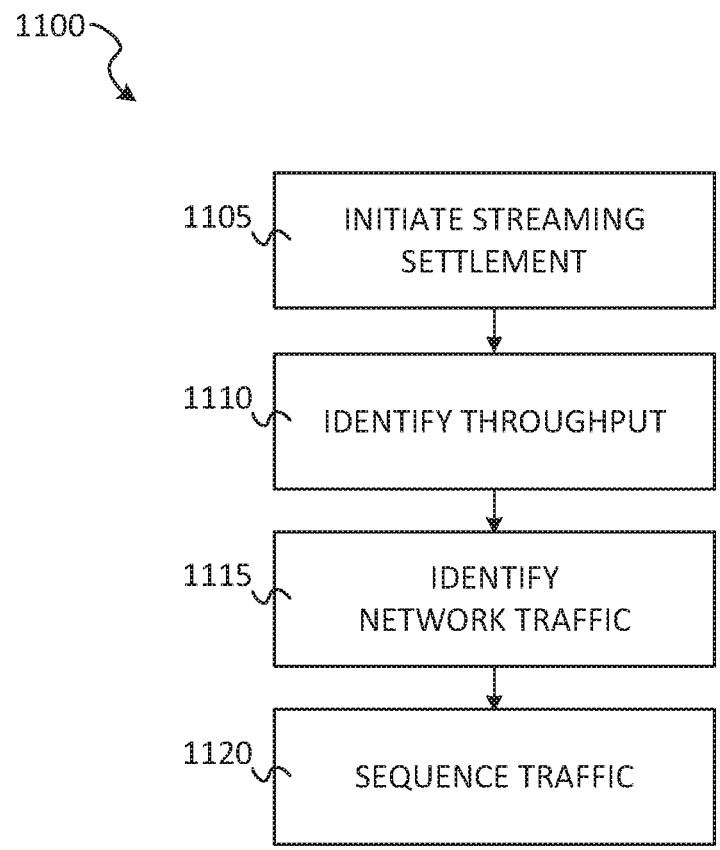
FIG. 11 shows a flow diagram for example method for sequencing traffic, according to some example embodiments.

FIG. 11 shows a flow diagram for example method 1100 for sequencing traffic from blockchain entities to a surge guarded entity, according to some example embodiments. As discussed above, one of the entities can manage payments from requested services, such as fuel refills, bridge toll, parking meters, or auto mechanic work. A network slowdown can occur if the entity managing payments batches the payments and/or only performs payment clearances at certain times. For example, if the third entity 315 is a bank, payment confirmation rates for the bank are directly related to the number of payments submitted to the bank, and the speed at which payments can settle or clear. A bank using automated clearing house (ACH) for payment settlements is limited as it batches transactions into batches of approximately one-hundred, and there is a cut-off time in the evening (e.g., 5 PM) after which point no transaction settlements can occur. Compounding the issue is the payment size. In particular, if the payment size is very small, as they are in microtransactions (e.g., 10 cents for a parking meter, or 70 cents for a bridge toll in Florida, 10 cent charge for every mile driven in a smart contract managed insurance policy), and the millions of vehicles are generating small transactions, then the payment processing entity can rapidly become overloaded, and hardware appliance micropayments are rendered impossible to implement in a network feasible manner. To this end, the sequence engine 625 is configured to identify electronic requests (e.g., micropayment invoices) transmitted to the payment processing entity, and sequences the transmitted requests to the payment processing entity to ensure requests can be completed in a streaming manner that can be settled within minutes without harming or overloading the payment processing entity (e.g., the banking network). In the below example, a fuel refill service request for a vehicle with a corresponding block object is discussed as an example, however it is appreciated that the method 500 can be integrated into other block-based transaction sequencing approaches.

At operation 1105, the sequence engine 625 initiates streaming settlements between entities of the block architecture (e.g., between entities 305, 310, 315). Configuration of streaming settlements can involve the banking entity (e.g., the third entity 315 in FIG. 3) being configured to receive a payment request and approve it without submission to an ACH or payment network such as a card network (e.g., Visa). The banking entity can safely perform streaming settlements without over extending themselves based on several features of the hardware authentication network architecture 150, including: the banking entity's ability to ascertain and trust the requesting entity based on the requesting entity having a high fingerprint access score, where the fingerprint access score is generated from a history of streaming sensor data and constantly regenerated, and further because the banking entity can rapidly perform revalidation that the service requested has been performed. For instance, whereas conventionally the banking entity submits in batches of transactions to an ACH which can take days or weeks to clear, the banking entity in the method 1100 can receive a transaction request directly from the payor or merchant (e.g., auto-mechanic) via the merchant nodes (e.g., peer nodes controlled by the merchant within the peer node network 330) and no extra payment hops need occur between the peer nodes. The banking entity can then quickly settle the payment via a trust level pre-configured for the vehicle's fingerprint score (e.g., trust level can be set to 9/10, or a specified level), and further can perform revalidation that the service was indeed performed by accessing the distribute ledger blockchain that records the sensor readings (e.g., a fuel gauge that has an increased fuel level due to a refill). As an additional example, whereas a toll for 70 cents may conventionally be prohibitively expensive for the banking entity to settle due to the hops in the payment network (e.g., where each hop corresponds to an entity, such as credit card company, that charges a fee to route), here the banking entity can auto approve the 70 cent toll as the toll was directly received peer to peer with no free-incurring hops, and auto-approved based on the payment amount being small (e.g., below a smart contract pre-set threshold) and further based on the vehicle's fingerprint permission values indicating trustworthiness for that level of transaction. Upon completion, the banking entity can immediately record payment settlement (e.g., operations 515B and 520E) for the small amount instead of batching. Further, in some example embodiments, the blockchain ledger is a permissioned private blockchain (e.g., Hyperledger Fabric) in which blocks can be generated for each transaction, small batches of transactions, or larger batches of transactions without miner's fees to create said blocks, such that the payments can be settled and recorded on the distributed ledger in a streaming manner (e.g., within minutes).

At 1110, the sequence engine 625 determines a throughput of data being transmitted to the banking entity. For example, with reference to FIG. 3, the throughput 331 of data transmitted to the third entity 315, which is a banking network, is determined to set a bandwidth limit for the third entity. Further, according to some example embodiments, the throughput limit is the rate at which transactions submitted to the third entity 316 are settled and recorded on the blockchain. For instance, with reference to FIG. 5, the sequence engine 625 can identify the throughput of the banking entity (e.g., payment processor entity 515) recording to the blockchain at operation 520D or at operation 520E. This can indicate how quickly the banking entity can settle the streaming transactions in secure way. That is, while the functionality of settlement clearance may or may not be disclosed by the banking entity (many banking entities may choose to keep their settlement mechanics secret), the rate of settlements (e.g., recordation's to a block) is known as the settlements are recorded to a block and visible to other entities within the private network (e.g., as in operation 520E for the invoice generated at operation 510E). Thus, for example, the sequence engine 625 can determine a throughput limit as a bandwidth: data per time with padding (e.g., 1,000 transactions per minute plus/minus 100 transactions) that the banking entity can settle using the streaming settlement of operation 1105.

At operation 1115, the sequence engine 625 identifies an amount of network traffic. For instance, at operation 1115 the sequence engine 625 can identify that a multitude of vehicles in North America submitted data approximately at the same time (e.g., at the start of the work day), and that a quantity of service requests are generated (e.g., operation 510A), which take time to complete (e.g., operation 510C), and thus a large quantity of payment transactions are either currently being sent to the banking entity or will soon be sent to the banking entity.

At operation 1120, the sequence engine 625 sequences the transaction requests sent to the banking entity using the identified bandwidth limit. For example, the sequence engine 625 can buffer or time delay transactions, such that the requests transmitted to the banking entity stay within the bandwidth settlement limit of operation 1110.

In some example embodiments, the sequencing of transaction is implemented for all nodes (e.g., peers) of the banking entity, while in other embodiments, the sequencing of transactions is implemented only for a hot-spot of peers of the banking entity. For example, if the banking entity has peers throughout North America, and a large quantity of vehicle transactions occur in Florida at the same time, the sequence engine 625 can sequence or buffer only those transactions sent to nearby peers of the banking entity (e.g., buffer only those in Florida). Additionally, the sequence engine 625 can reroute transactions to peer nodes of the banking entity that are geographically outside the hot-spot (e.g., in another state). In this way, hardware appliance generated requests can be surge guarded from an entity to enable streaming on-chain settlements in near-real time.

Figure 12B:
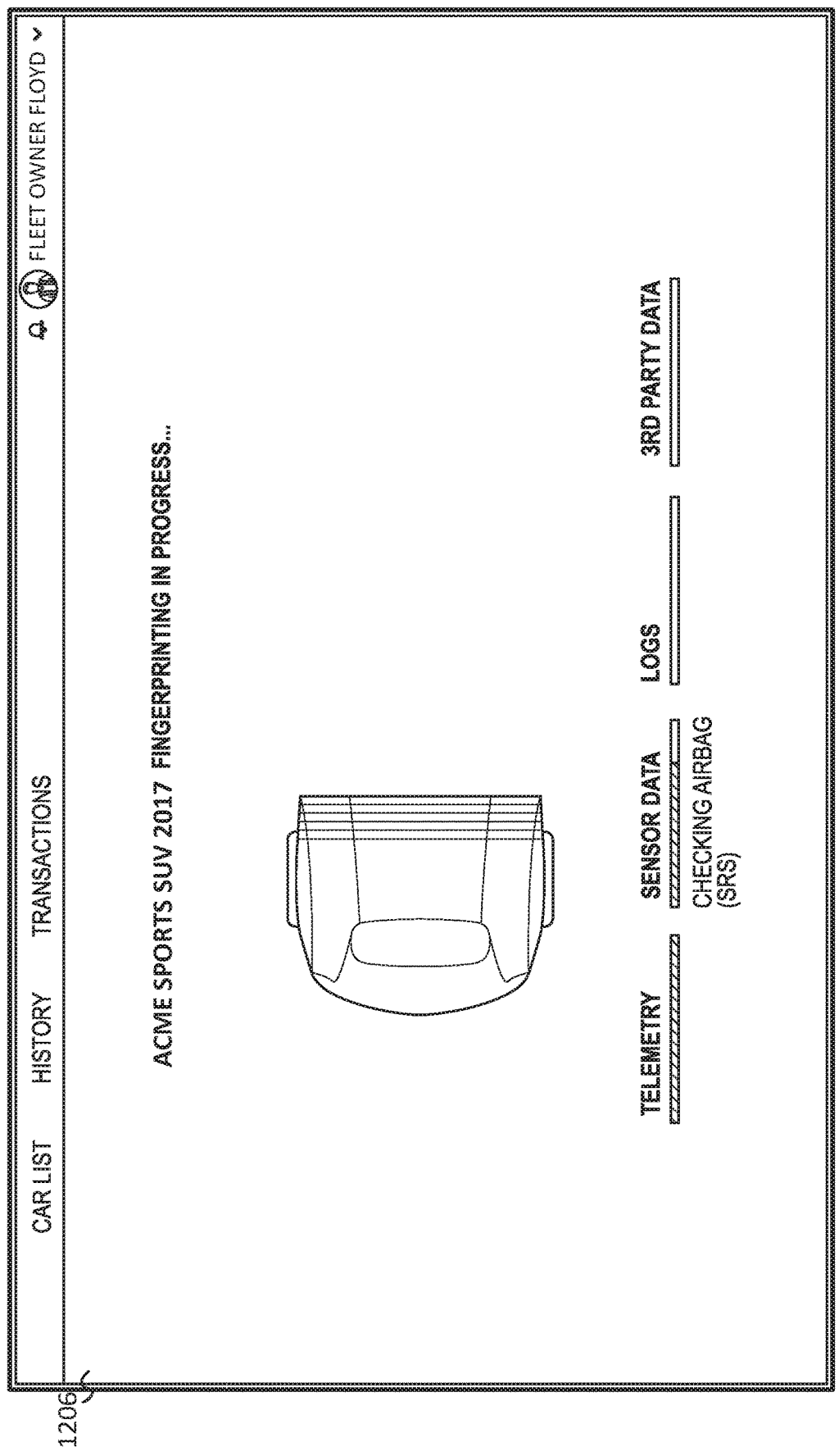
Figure 12C:
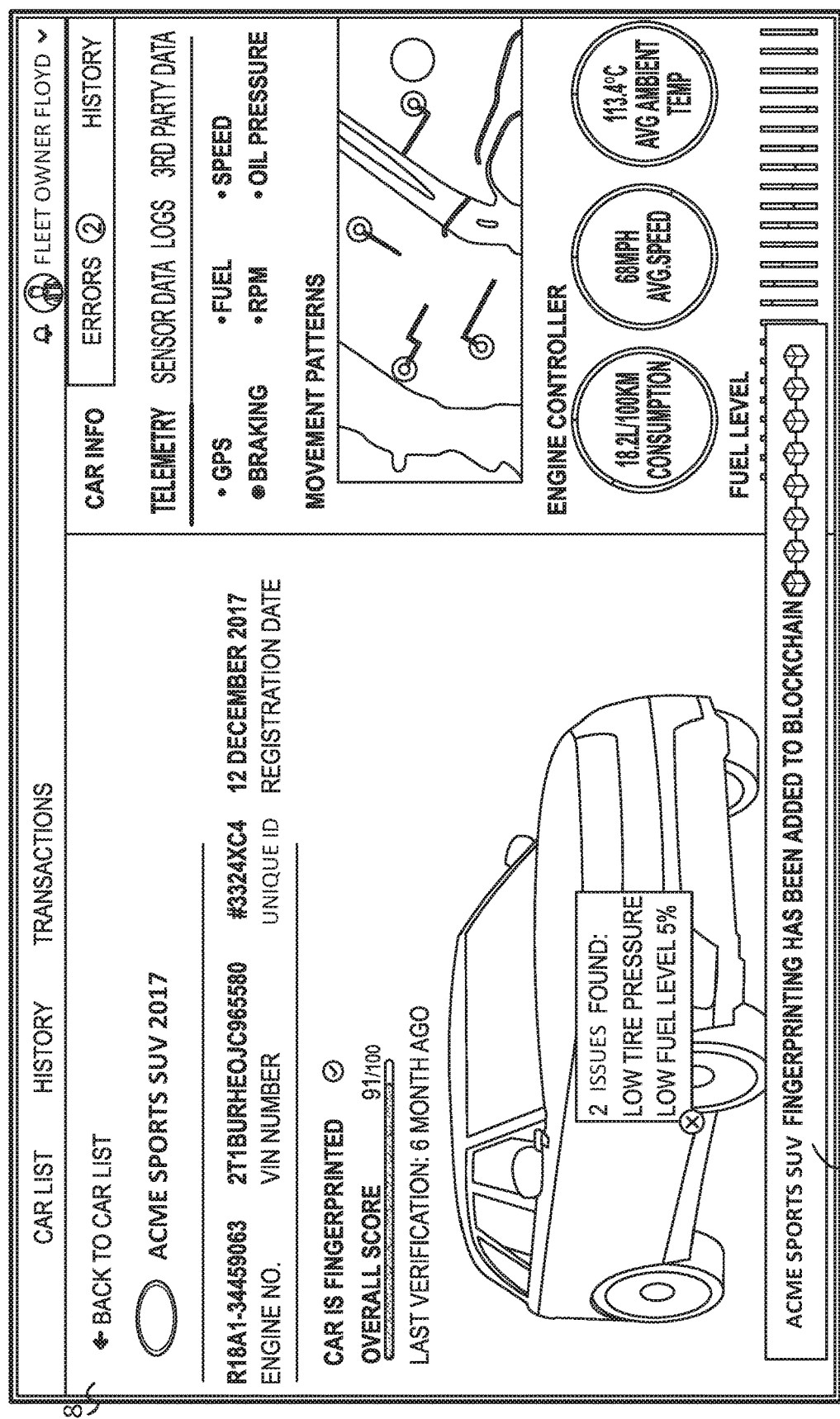
Figure 12D:
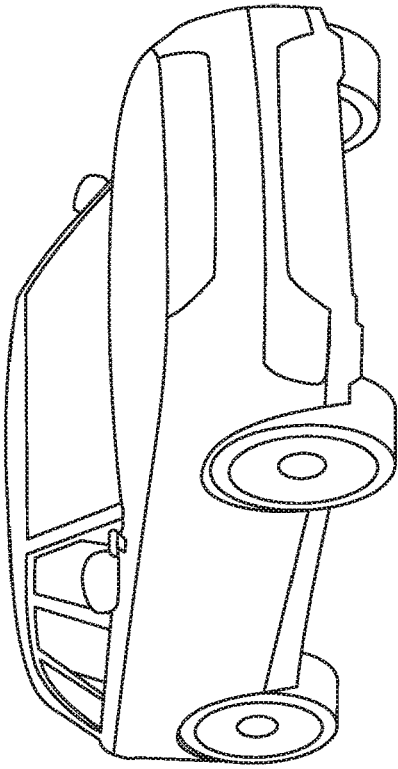
Figure 12E:
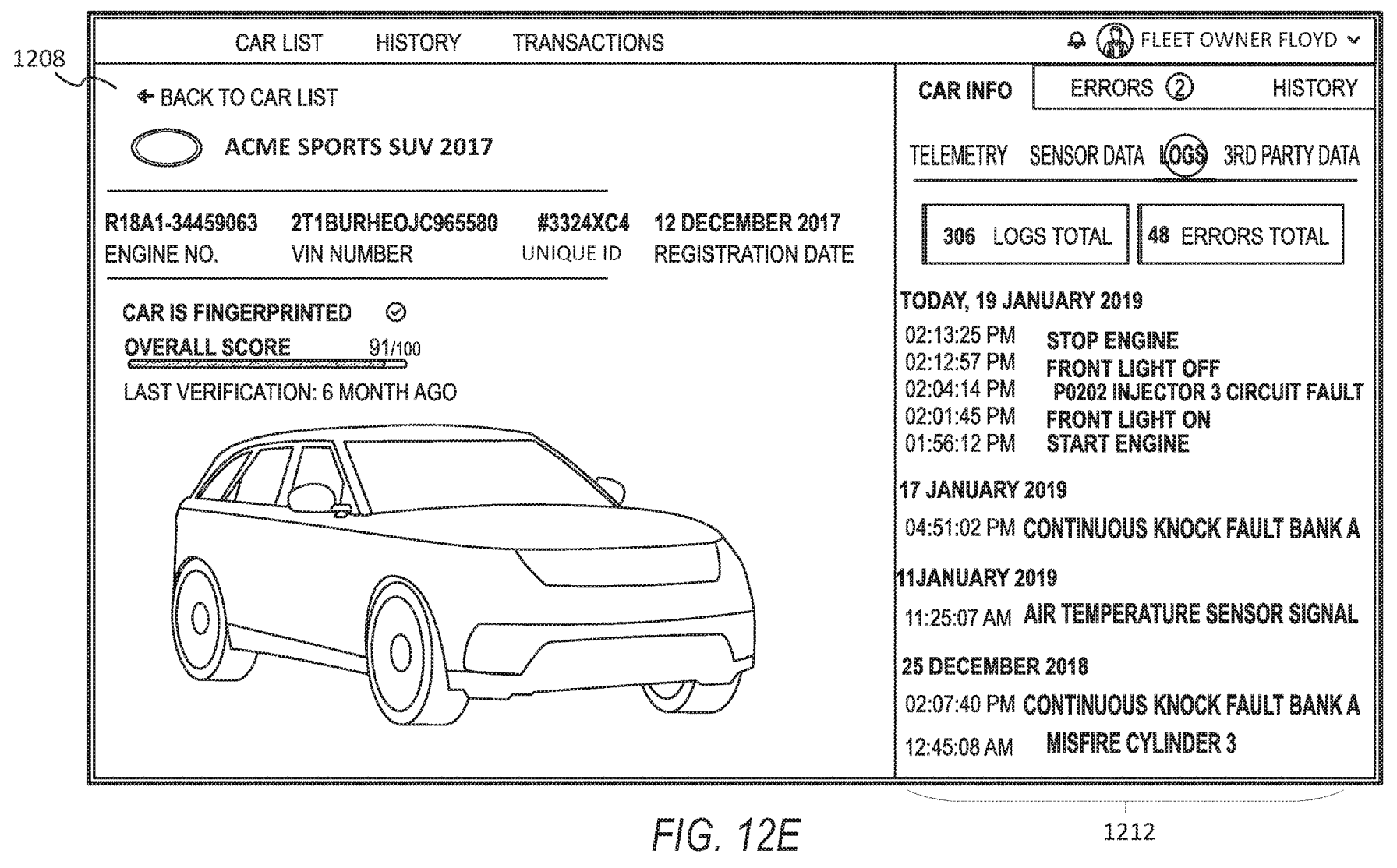
Figure 12F:
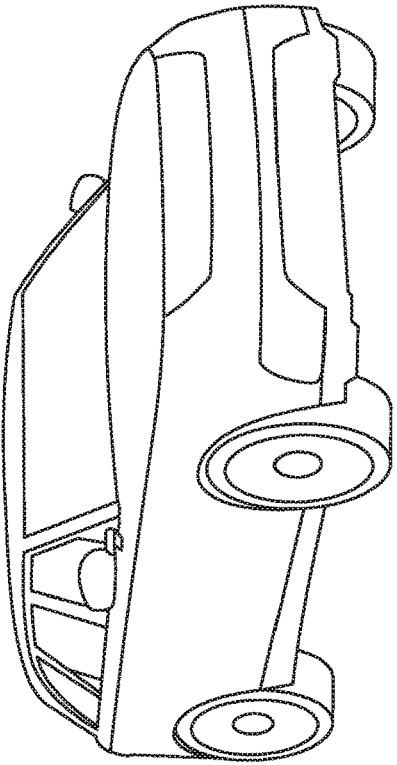
Figure 12G:
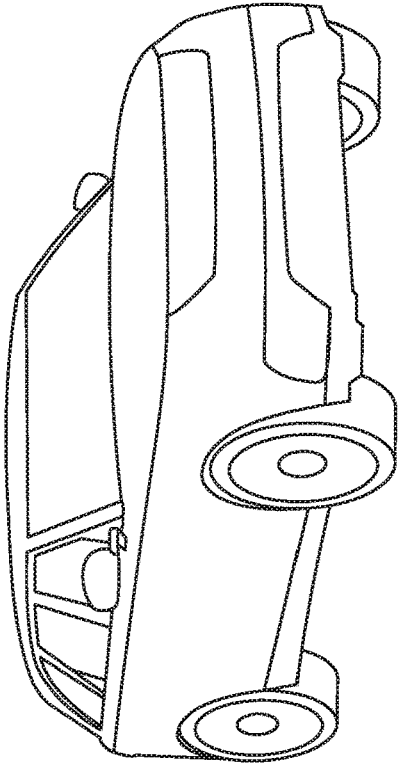
Figure 12H:
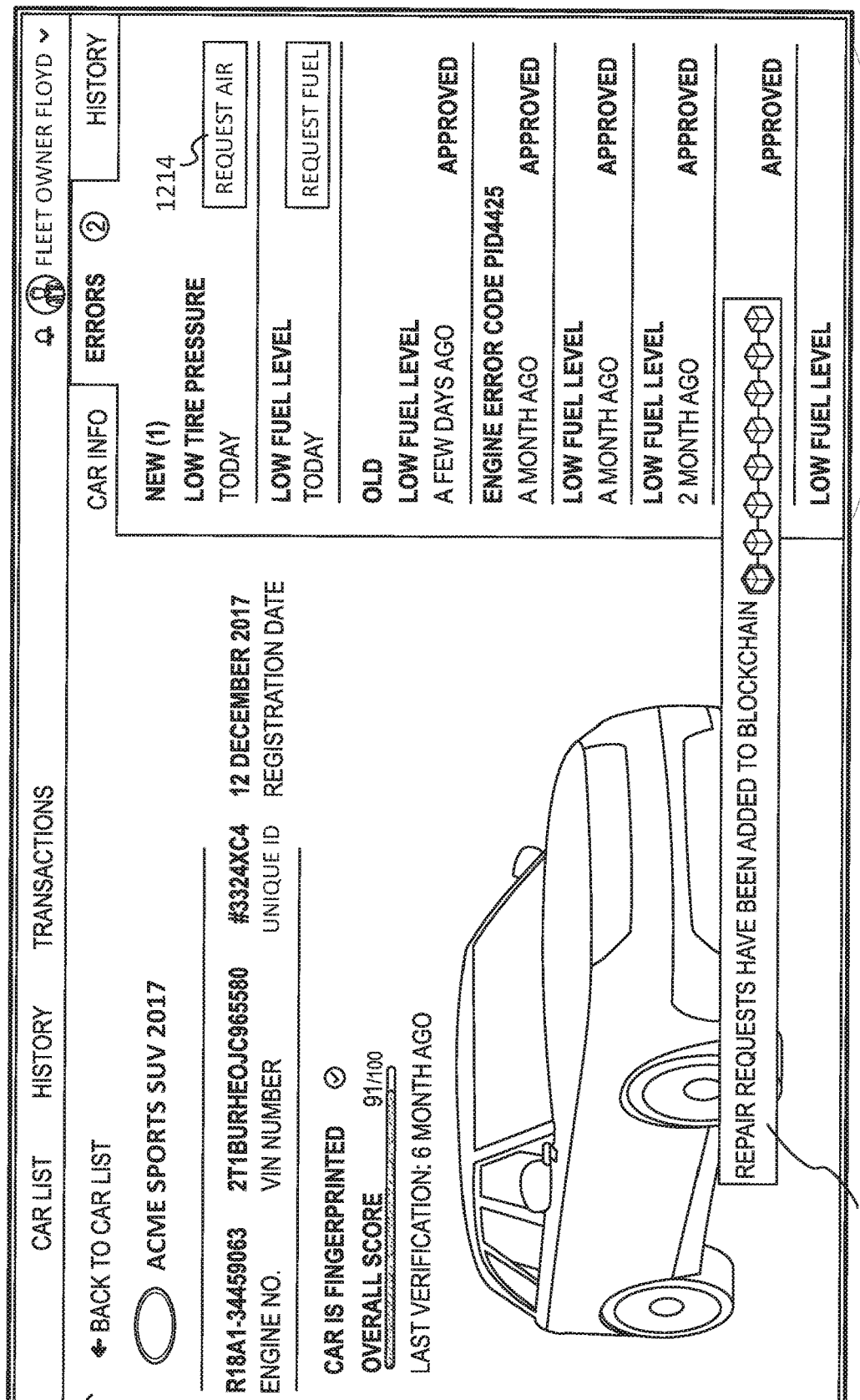
Figure 12J:

FIGS. 12A-12K show example user interfaces for implementing hardware appliance authentication, according to some example embodiments. FIGS. 12A-12H are user interfaces displayed on a first user device (e.g., logged-in browser session displayed on a laptop of a fleet owner that manages a fleet of vehicles), FIGS. 12I and 12J show user interfaces displayed on a second user device (e.g., a desktop computer of an auto-mechanic), followed by additional user interface displayed on the first user device in FIG. 12K.

In FIG. 12A, a fleet owner user interface 1200 displays a list of vehicles 1202 managed by the user "Fleet Owner Floyd". Each of the vehicles in the list of vehicles 1202 corresponds to a block object managed by the architecture 150, comprising a unique identifier, a machine account, fingerprint access value generated from sensors (e.g., fuel data) and stored in memory on the vehicle (e.g., VIN data). To initiate a request for a given vehicle from the list, the user can select via selector icon 1204 on one or more of the vehicles to initiate a service request.

In FIG. 12B, in response to selecting the "Acme Sports SUV 2017" from the list of vehicles 1202, the vehicle's fingerprint data is regenerated as shown in user interface 1206. For example, the vehicle has a wireless communication module with an integrated SIM-card that enables the vehicle to upload telemetry data (e.g., location data), sensor data, log data stored in memory of the car. Additionally, external data for the car maintained by third party websites (e.g., vehicle records websites) can be retrieved for use in generating the fingerprint value.

Next, in FIG. 12C, a vehicle user interface 1208 is displayed with the latest fingerprint data (e.g., a score of 91/100) and other data for the vehicle is displayed within with tabbed window 1212, which is showing telemetry data from the vehicle that has been recorded to the block object of the vehicle. Further, a pop-up window 1210 indicates the latest fingerprint data for the vehicle has been stored in the blockchain.

FIG. 12D shows the tabbed window 1212 displaying example sensor data from the vehicle that has been recorded to the block chain object for the vehicle. FIG. 12E shows the tabbed window 1212 displaying example log data from the vehicle that has been recorded to the block chain object for the vehicle. FIG. 12F shows the tabbed window 1212 displaying example 3rd party data pulled from third-party websites via respective APIs of the 3rd party websites, Edmunds data, and CarFax data. Additionally, vehicle specification data (e.g., engine type, dimensional data) is displayed in the tabbed window 1212 below the 3rd party provided data. FIG. 12G shows the tabbed window 1212 displaying example history data that has been pulled from the blockchain data for the vehicle.

FIG. 12H shows the tabbed window 1212 displaying example error data from the vehicle for errors detected from the last data set provided by the vehicle. As illustrated, the vehicle has low tire pressure (as detected by integrated tire pressor sensors) and further the vehicle is low in fuel (as detected by the fuel tank sensor). The fleet owner user can initiate a service request by selecting a request service button, such as Request Air button 1214. In response to selection of the Request Air button, a request for the vehicle is generated and recorded on-chain as indicate by pop-up notification 1216. The request specifies a type of task being requested, along with vehicle fingerprint data (e.g., 91/100) which can be used to auto-approve, auto-reject, manually approve the request via the smart contract managed by peers of the peer network (e.g., network 330 in FIG. 3).

With reference to FIG. 12I, the request is transmitted to a client application and displayed within user interface 1218, which is a logged in web-session for the service provider "Mike the Mechanic". As illustrated, the "new order" for the Acme Sports SUV 2017 is displayed at the top of the list and the service provider can select the new order via selector icon 1221.

In response to selecting the new order, user interface 1222 is displayed on the client device of the service provider, as shown in FIG. 12J. In the example of FIG. 12J, a new window 1224 animates into view with a map for the service provider to view the vehicle's location (per the latest vehicle info provided during fingerprinting as shown in FIG. 12B), and input fields for the service provider to enter estimated completion date information, price information, and other data (e.g., notes, comments). Upon the service provider selecting the start repair button 1227, a notification 1226 indicates repair information has been recorded on-chain for the vehicle, including, for example, the repair start date, the input completion data, the price data, and/or any notes entered.

Figure 12K:
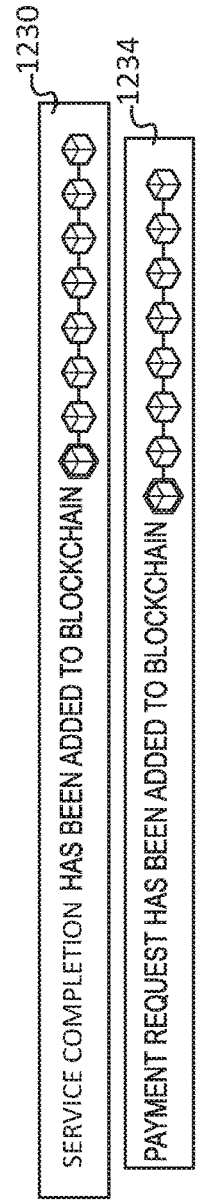

Returning to the fleet owner's device, in FIG. 12K the user interface 1228 includes a first pop-up notification 1230 indicating that the service has completed. Followed by animation of another pop-up notification 1234 indicating that a payment request from the banking entity (e.g., third entity 315) for the service request has been recorded to the blockchain. Upon the banking entity settling the payment, notification 1232 is displayed to notify the fleet owner that the bank has quickly approved four transaction payments, including the payment for the tire pressure service.

Figure 13:
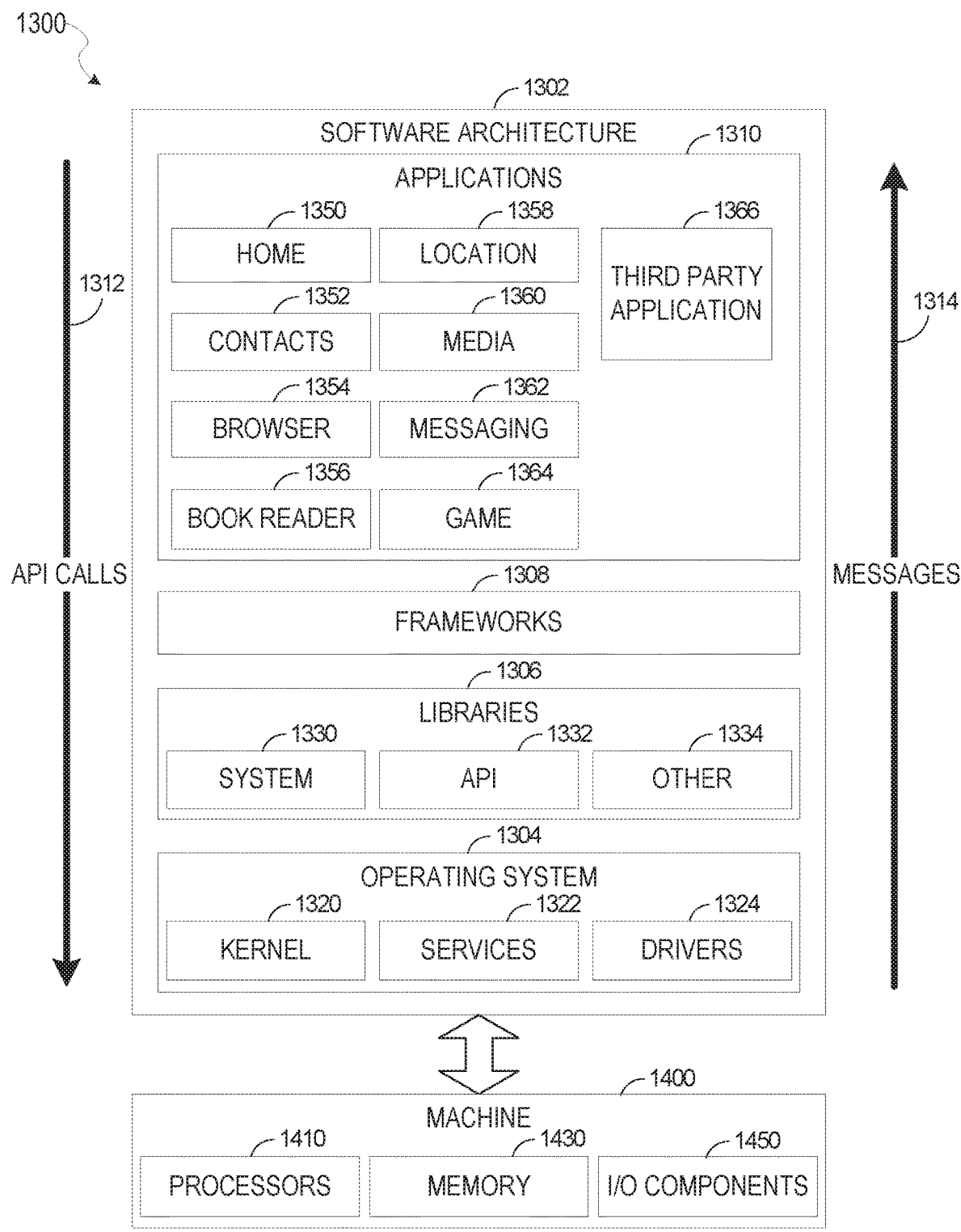
FIG. 13 is a block diagram illustrating a representative software architecture, which may be used in conjunction with various hardware architectures herein described.

FIG. 13 is a block diagram 1300 illustrating an example software architecture 1306, which may be used in conjunction with various hardware architectures herein described. FIG. 13 is a non-limiting example of a software architecture, and it will be appreciated that many other architectures may be implemented to facilitate the functionality described herein. The software architecture 1306 may execute on hardware such as a machine 1400 of FIG. 14 that includes, among other things, processors, memory, and I/O components. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes a memory/storage 1356, which also has the executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1416, and a presentation layer 1314. Operationally, the applications 1416 and/or other components within the layers may invoke API calls 1308 through the software stack and receive a response in the form of messages 1312. The layers illustrated are representative in nature and not all software architectures have all layers. For example, some mobile or special-purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1416 and other software components/modules.

The frameworks/middleware 1318 provide a higher-level common infrastructure that may be used by the applications and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1416 may use built-in operating system functions (e.g., kernel 1322, services 1324, and/or drivers 1326), libraries 1320, and frameworks/middleware 1318 to create user interfaces to interact with users of the system. Alternatively, or additionally, in some systems, interactions with a user may occur through a presentation layer, such as the presentation layer 1314. In these systems, the application/component "logic" can be separated from the aspects of the application/component that interact with a user.

Figure 14:
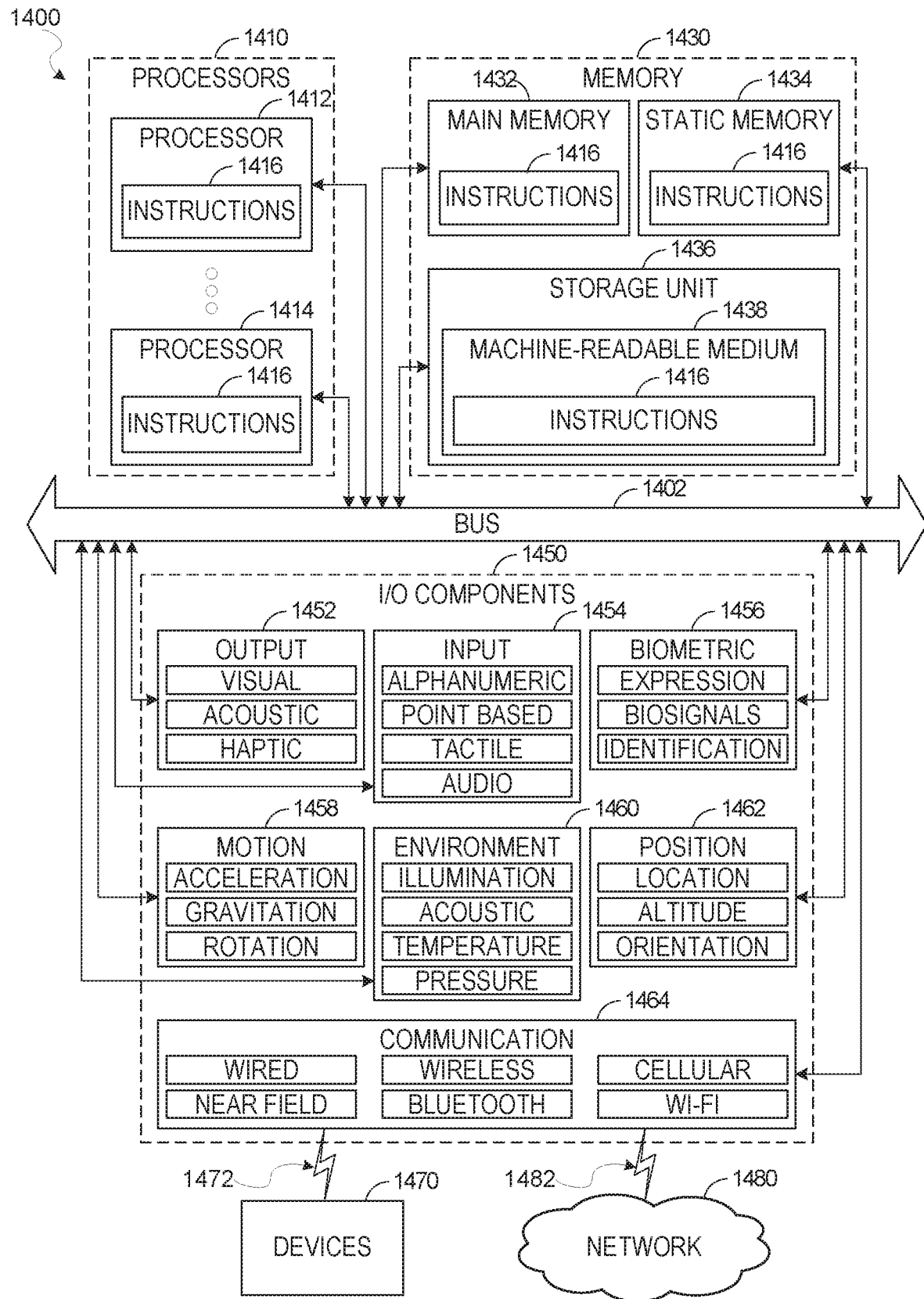
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. As such, the instructions 1456 may be used to implement modules or components described herein. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. The memory/storage 1430 may include a main memory 1432, static memory 1434, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436 (e.g., on machine readable-medium 1438), within at least one of the processors 1410 (e.g., within the processor cache memory accessible to processors 1414 or 1414), or any suitable combination thereof, during execution thereof by the machine 1400. Accordingly, the memory 1432, the storage unit 1436, and the memory of the processors 1410 are examples of machine-readable media.

The I/O components 1450 may include a wide variety of components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environment components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environment components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1416 for execution by the machine 1400, and includes digital or analog communications signals or other intangible media to facilitate communication of such instructions 1416. Instructions 1416 may be transmitted or received over the network 1480 using a transmission medium via a network interface device and using any one of a number of well-known transfer protocols.

"CLIENT DEVICE" in this context refers to any machine 1400 that interfaces to a network 1480 to obtain resources from one or more server systems or other client devices 110. A client device 110 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1480.

"COMMUNICATIONS NETWORK" in this context refers to one or more portions of a network 1480 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1480 may include a wireless or cellular network and the coupling 1482 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 1416 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions 1416 (e.g., code) for execution by a machine 1400, such that the instructions 1416, when executed by one or more processors 1410 of the machine 1400, cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1414 or a group of processors 1410) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1400) uniquely tailored to perform the configured functions and are no longer general-purpose processors 1410.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1414 configured by software to become a special-purpose processor, the general-purpose processor 1414 may be configured as respectively different special-purpose processors (e.g., comprising different hardware components) at different times. Software accordingly configures a particular processor 1414 or processors 1410, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1410 that are temporarily configured (e.g., by software) or permanently configured to perform the relevant operations. Whether temporarily or permanently configured, such processors 1410 may constitute processor-implemented components that operate to perform one or more operations or functions described herein. As used herein, "processor-implemented component" refers to a hardware component implemented using one or more processors 1410. Similarly, the methods described herein may be at least partially processor-implemented, with a particular processor 1414 or processors 1410 being an example of hardware. For example, at least some of the operations of a method may be performed by one or more processors 1410 or processor-implemented components. Moreover, the one or more processors 1410 may also operate to support performance of the relevant operations in a "cloud computing" environment or as a "software as a service" (SaaS). For example, at least some of the operations may be performed by a group of computers (as examples of machines 1400 including processors 1410), with these operations being accessible via a network 1480 (e.g., the Internet) and via one or more appropriate interfaces (e.g., an API). The performance of certain of the operations may be distributed among the processors 1410, not only residing within a single machine 1400, but deployed across a number of machines 1400. In some example embodiments, the processors 1410 or processor-implemented components may be located in a single geographic location (e.g., within a home environment, an office environment, or a server farm). In other example embodiments, the processors 1410 or processor-implemented components may be distributed across a number of geographic locations.

"PROCESSOR" in this context refers to any circuit or virtual circuit (a physical circuit emulated by logic executing on an actual processor 1414) that manipulates data values according to control signals (e.g., "commands," "op codes," "machine code," etc.) and which produces corresponding output signals that are applied to operate a machine 1400. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1410 may further be a multi-core processor 1410 having two or more independent processors 1414, 1414 (sometimes referred to as "cores") that may execute instructions 1416 contemporaneously.

What is claimed is:

1. A method comprising:
receiving, from a vehicle network interface of a vehicle, sensor data generated by a plurality of sensors of the vehicle;
generating, from the sensor data, a vehicle permission value indicating a level of access to blockchain tasks managed by a blockchain network;
identifying a blockchain task request for the vehicle;
validating the vehicle for the blockchain task request based on the vehicle permission value generated from the sensor data of the vehicle satisfying a pre-configured blockchain threshold that is pre-configured for the blockchain task request; and
storing a validation record indicating the vehicle is validated for the blockchain task request based on the vehicle permission value.

2. The method of claim 1, wherein the blockchain task request is generated based on a sensor value from one or more of the sensors of the vehicle not satisfying a sensor threshold.

3. The method of claim 2, further comprising:
receiving a completion notification indicating the blockchain task request for the vehicle is complete; and revalidating the vehicle for the blockchain task request based on an updated sensor value from the one or more sensors satisfying the sensor threshold.

4. The method of claim 3, further comprising:
storing a revalidation record on the blockchain indicating the blockchain task request is revalidated based on the updated sensor value.

5. The method of claim 4, further wherein the sensor is a fuel sensor of the vehicle.

6. The method of claim 1, wherein the plurality of sensors of the vehicle comprises a first sensor and a second sensor, and the sensor data comprises a first sensor readings set generated by the first sensor and a second sensor readings set generated by the second sensor.

7. The method of claim 6, further wherein generating the vehicle permission value comprises:
identifying a first sensor numerical score preconfigured for the first sensor;
modifying the first sensor numerical score based on individual values of the first sensor readings set;
identifying a second sensor numerical score preconfigured for the second sensor;
modifying the second sensor numerical score based on individual values of the second sensor readings set; and
generating the vehicle permission value by combining the modified first sensor numerical score and the modified second sensor numerical score.

8. The method of claim of claim 6, further wherein the first sensor is a fuel gauge and the first sensor readings are fuel gauge readings, wherein the second sensor is an odometer and the second sensor readings are odometer readings, and wherein generating the vehicle permission value comprises:
determining that an increase in the odometer readings is offset by a decrease in fuel gauge readings.

9. A system comprising:
one or more processors of a machine; and
a non-transitory memory for storing instructions that, when executed by the one or more processors, cause the machine to perform operations comprising:
receiving, from a vehicle network interface of a vehicle, sensor data generated by a plurality of sensors of the vehicle;
generating, from the sensor data, a vehicle permission value indicating a level of access to blockchain tasks managed by a blockchain network;
identifying a blockchain task request for the vehicle;
validating the vehicle for the blockchain task request based on the vehicle permission value generated from the sensor data of the vehicle satisfying a pre-configured blockchain threshold that is pre-configured for the blockchain task request; and
storing a validation record indicating the vehicle is validated for the blockchain task request based on the vehicle permission value.

10. The system of claim 9, wherein the blockchain task request is generated based on a sensor value from one or more of the sensors of the vehicle not satisfying a sensor threshold.

11. The system of claim 10, the operations further comprising:
receiving a completion notification indicating the blockchain task request for the vehicle is complete;
revalidating the vehicle for the blockchain task request based on an updated sensor value from the one or more sensors satisfying the sensor threshold.

12. The system of claim 11, the operations further comprising:
storing a revalidation record on the blockchain indicating the blockchain task request is revalidated based on the updated sensor value.

13. The system of claim 12, further wherein the sensor is a fuel sensor of the vehicle.

14. The system of claim 9, wherein the plurality of sensors of the vehicle comprises a first sensor and a second sensor, and the sensor data comprises a first sensor readings set generated by the first sensor and a second sensor readings set generated by the second sensor.

15. The system of claim 14, further wherein generating the vehicle permission value comprises:
identifying a first sensor numerical score preconfigured for the first sensor;
modifying the first sensor numerical score based on individual values of the first sensor readings set;
identifying a second sensor numerical score preconfigured for the second sensor;
modifying the second sensor numerical score based on individual values of the second sensor readings set; and
generating the vehicle permission value by combining the modified first sensor numerical score and the modified second sensor numerical score.

16. The system of claim of claim 14, further wherein the first sensor is a fuel gauge and the first sensor readings are fuel gauge readings, wherein the second sensor is an odometer and the second sensor readings are odometer readings, and wherein generating the vehicle permission value comprises:
determining that an increase in the odometer readings is offset by a decrease in fuel gauge readings.

17. A non-transitory machine-readable storage device embodying instructions that, when executed by a machine, cause the machine to perform operations comprising:
receiving, from a vehicle network interface of a vehicle, sensor data generated by a plurality of sensors of the vehicle;
generating, from the sensor data, a vehicle permission value indicating a level of access to blockchain tasks managed by a blockchain network;
identifying a blockchain task request for the vehicle;
validating the vehicle for the blockchain task request based on the vehicle permission value generated from the sensor data of the vehicle satisfying a pre-configured blockchain threshold that is pre-configured for the blockchain task request; and
storing a validation record indicating the vehicle is validated for the blockchain task request based on the vehicle permission value.

18. The machine-readable storage device of claim 17, wherein the blockchain task request is generated based on a sensor value from one or more of the sensors of the vehicle not satisfying a sensor threshold.

19. The machine-readable storage device of claim 18, the operations further comprising:
receiving a completion notification indicating the blockchain task request for the vehicle is complete;
revalidating the vehicle for the blockchain task request based on an updated sensor value from the one or more sensors satisfying the sensor threshold.

20. The machine-readable storage device of claim 19, the operations further comprising:

storing a revalidation record on the blockchain indicating the blockchain task request is revalidated based on the updated sensor value.

\* \* \* \* \*